US008363253B2

(12) United States Patent
Urakawa

(10) Patent No.: US 8,363,253 B2
(45) Date of Patent: Jan. 29, 2013

(54) COMMUNICATION DEVICE

(75) Inventor: Yutaka Urakawa, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 595 days.

(21) Appl. No.: 12/575,620

(22) Filed: Oct. 8, 2009

(65) Prior Publication Data

US 2010/0085601 A1    Apr. 8, 2010

(30) Foreign Application Priority Data

Oct. 8, 2008   (JP) ................................ 2008-261885

(51) Int. Cl.
G06F 15/00 (2006.01)
G06F 15/16 (2006.01)
(52) U.S. Cl. ...................................... 358/1.15; 709/218
(58) Field of Classification Search .................. 358/1.15
See application file for complete search history.

(56) References Cited

U.S. PATENT DOCUMENTS

| 2006/0110171 | A1* | 5/2006 | Miyazawa et al. ................. 399/8 |
| 2007/0174298 | A1* | 7/2007 | Tanimoto ......................... 707/10 |
| 2007/0300162 | A1 | 12/2007 | Goto |
| 2008/0043282 | A1* | 2/2008 | Tsuboi .......................... 358/1.15 |
| 2008/0243818 | A1* | 10/2008 | Ming ............................... 707/5 |

FOREIGN PATENT DOCUMENTS

| JP | 10-163607 | 6/1998 |
| JP | 10-260955 | 9/1998 |
| JP | 2001-306596 | 11/2001 |
| JP | 2003-110686 | 4/2003 |
| JP | 2004-21521 | 1/2004 |
| JP | 2006-209538 | 8/2006 |
| JP | 2007-148885 | 6/2007 |
| JP | 2007-199998 | 8/2007 |
| JP | 2008-135994 | 6/2008 |

OTHER PUBLICATIONS

Japanese Official Action dated Aug. 24, 2010 together with English translation.
Impress Corporation, Displays titles of articles delivered from RSS-enabled information sites in tickers—"Dirty News Reader", [online] May 26, 2004, Internet URL: http://www.forest.impress.co.jp/article/2004/05/26/dirtynewsreader.html.

* cited by examiner

Primary Examiner — Saeid Ebrahimi Dehkordy
(74) Attorney, Agent, or Firm — Scully, Scott, Murphy & Presser, P.C.

(57) ABSTRACT

A communication device capable of accessing a network device is provided. The communication device includes a clock, a location information storage to store summary location information, a summary information obtaining system to obtain content summary information, a summary information storage to store the obtained content summary information, a display system to display the information concerning the contents generated based on the content summary information during a predetermined time range, a time range setting system to set the predetermined time range on basis of a source of the content summary information, an extractor to extract the content summary information which is set to be displayed in the display system during the predetermined time range, and a display controller to control the display system to display the information concerning the contents which is included in the extracted summary information.

9 Claims, 11 Drawing Sheets

SETTINGS FOR INFORMATION SITES

| | | | DISPLAY STARTING TIME | DISPLAY COMPLETION TIME |
|---|---|---|---|---|
| ▷ URL 1 | 50a1 | http://www.example0.com | 50b1 6:00 | 15:00 50c1 |
| URL 2 | 50a2 | http://www.example1.com | 50b2 12:00 | 18:00 50c2 |
| URL 3 | 50a3 | http://www.example2.com | 50b3 12:00 | 21:00 50c3 |
| ⋮ | | ⋮ | ⋮ | ⋮ |
| URL n | 50an | http://www.example n-1.com | 50bn | 50cn |

50d OK    50e CANCEL

FIG.3A

URL STORAGE AREA 102

| i | URL | DISPLAY STARTING TIME | DISPLAY COMPLETION TIME |
|---|---|---|---|
| 0 | http://www.example0.com | 6:00 | 15:00 |
| 1 | http://www.example1.com | 12:00 | 18:00 |
| 2 | http://www.example2.com | 12:00 | 21:00 |
| ⋮ | ⋮ | ⋮ | ⋮ |
| n-1 | http://www.example n-1.com | | |

100 / n SETS

FIG.3B

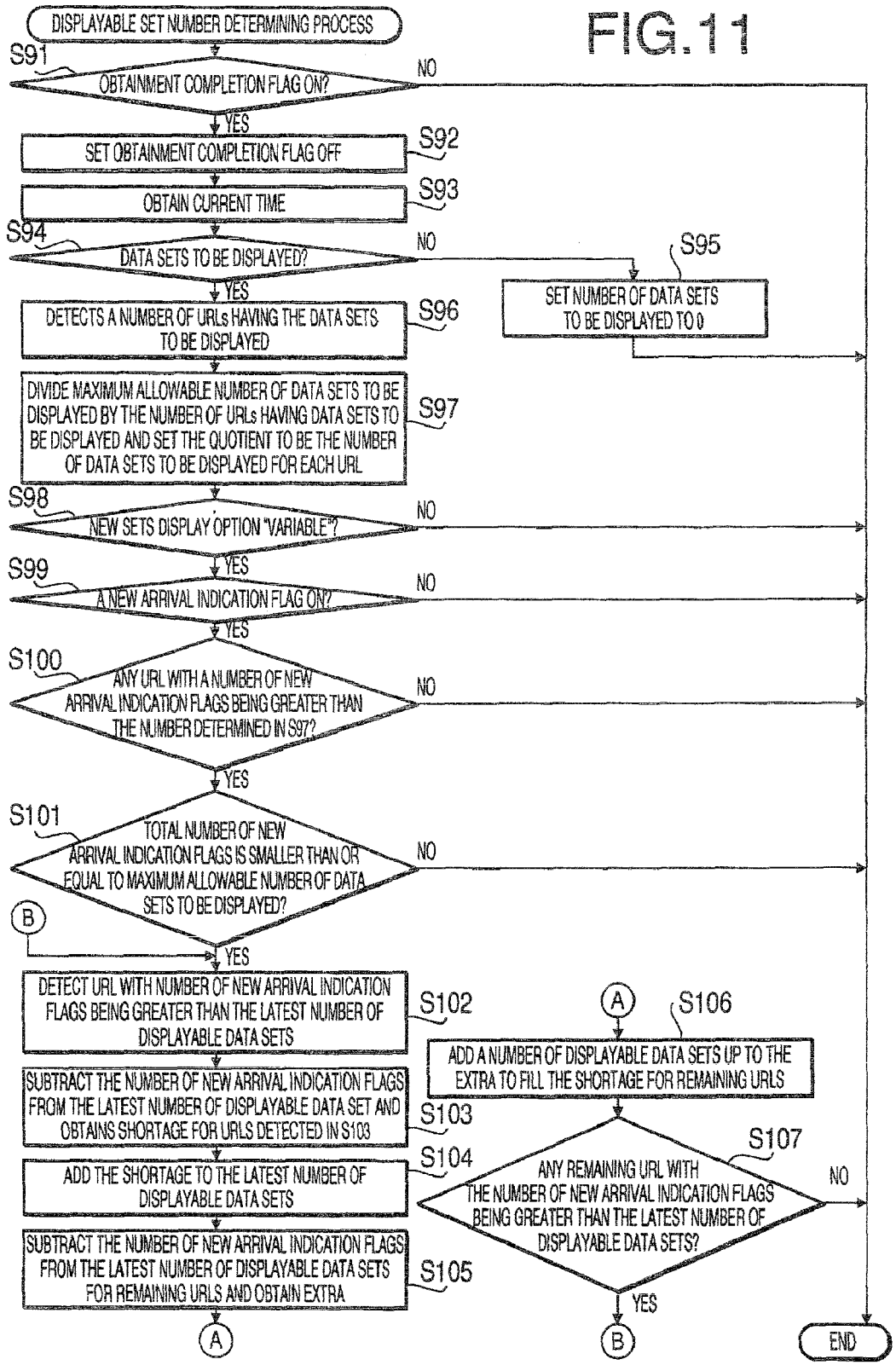

*100*

| i | URL | DISPLAY STARTING TIME | DISPLAY COMPLETION TIME |
|---|---|---|---|
| 0 | http://www.example0.com | 6:00 | 15:00 |
| 1 | http://www.example1.com | 12:00 | 18:00 |
| 2 | http://www.example2.com | 12:00 | 21:00 |

| i | URL | TIME RANGE | | | | |
|---|---|---|---|---|---|---|
| | | 6:00-11:59 | 12:00-14:59 | 15:00-17:59 | 18:00-20:59 | 21:00-06:00 |
| 0 | http://www.example0.com | 30 | 10 | - | - | - |
| 1 | http://www.example1.com | - | 10 | 15 | - | - |
| 2 | http://www.example2.com | - | 10 | 15 | 30 | - |

| i | URL | 6:00 | 9:00 | 12:00 | 15:00 | 18:00 | 21:00 |
|---|---|---|---|---|---|---|---|
| 0 | http://www.example0.com | 10 | 7 | 8 | 1 | 20 | 10 |
| 1 | http://www.example1.com | 0 | 17 | 15 | 2 | 0 | 10 |
| 2 | http://www.example2.com | 0 | 0 | 7 | 17 | 20 | 10 |

| i | URL | TIME RANGE | | | | |
|---|---|---|---|---|---|---|
| | | 6:00-11:59 | 12:00-14:59 | 15:00-17:59 | 18:00-20:59 | 21:00-06:00 |
| 0 | http://www.example0.com | 30 | 8 | - | - | - |
| 1 | http://www.example1.com | - | 15 | 13 | - | - |
| 2 | http://www.example2.com | - | 7 | 17 | 30 | - |

FIG.12D

COMMUNICATION DEVICE

CROSS REFERENCE TO RELATED APPLICATION

This application claims priority from Japanese Patent Application No. 2008-261885, filed on Oct. 8, 2008, the entire subject matter of which is incorporated herein by reference.

BACKGROUND

1. Technical Field

The present invention relates to a communication device.

2. Related Art

In computer networking environment, various information contents are open to public. The information contents are provided with titles and stored in storages of servers. Locations of the information contents are indicated by, for example, URLs. The servers may publish summarized content information, e.g., feed information, which includes the URL and the title of the content information. Formats of the feed information may be, for example, RSS and Atom. A software program to manipulate a terminal device to obtain the feed information from the server is known. If such a program is installed in a terminal device, the terminal device uses a URL to access and obtains the feed information. When the feed information is obtained, the terminal device generates a title of content information included in the feed information and displays the title on a display screen for a user to view. When the user designates (for example, clicks on) the title, the terminal device activates browser software and accesses a URL of the content information corresponding to the feed information. Thus, the content information can be obtained and presented to the user by the terminal device.

The software program to manipulate the feed information can be used in, for example, a multifunction peripheral (MFP) having a printing function and a scanning function. In such a configuration, relevant data concerning the content information included in the obtained feed information (e.g., a title of the content information, last-updated date of the content information, summarized information of the content, and a URL of the content information) may be displayed in a scrolling line.

SUMMARY

However, when the relevant data is displayed sequentially in the scrolling line in a display screen of the MFP, and when a volume of the relevant data is large, it may take long time until a last piece of relevant data comes to be displayed. Therefore, when the user desires to view the last piece of relevant data, the user is required to wait antecedent data to be scrolled until the last piece comes on the display.

In view of the above, the present invention is advantageous in that a communication device, by which information concerning content information can be presented to be viewed by a user effectively in shorter time, is provided.

According to an aspect of the present invention, a communication device is provided. The communication device is capable of accessing a network device storing content summary information according to summary location information, which indicates a source of the content summary information. The content summary information includes information concerning contents provided by an information providing server. The communication device includes a clock configured to indicate current time, a location information storage configured to store the summary location information, a summary information obtaining system configured to access the network device according to the summary location information stored in the location information storage and obtain the content summary information, a summary information storage configured to store the obtained content summary information, a display system configured to display the information concerning the contents generated based on the content summary information during a predetermined time range, a time range setting system configured to set the predetermined time range to display the information concerning the contents in the display system on basis of the source of the content summary information, an extractor configured to extract the content summary information which is set to be displayed in the display system during the predetermined time range from the summary information storage when the current time indicated by the clock is included in the predetermined time range, and a display controller configured to control the display system to display the information concerning the contents which is included in the extracted summary information.

BRIEF DESCRIPTION OF THE ACCOMPANYING DRAWINGS

FIG. 3A illustrates an information site entry interface to be presented to the user through the display panel of the MFP according to the embodiment of the present invention.

FIG. 3B illustrates a memory area for storing URLs in the MFP according to the embodiment of the present invention.

FIG. 11 is a flowchart to illustrate a displayable set number determining process to be performed in the MFP according to the embodiment of the present invention.

FIG. 12A illustrates URLs, display starting times and display completion times to display information obtained through the URLs stored in the URL storage area in the MFP according to the embodiment of the present invention. FIG. 12B illustrates numbers of data sets to be displayed in the display panel of the MFP according to the embodiment of the present invention. FIG. 12C illustrates numbers of pieces of newly obtained content updating information in time ranges set in the MFP according to the embodiment of the present invention. FIG. 12D illustrates modified number of data sets to be displayed in the display panel of the MFP according to the embodiment of the present invention.

DETAILED DESCRIPTION

Figure 1:
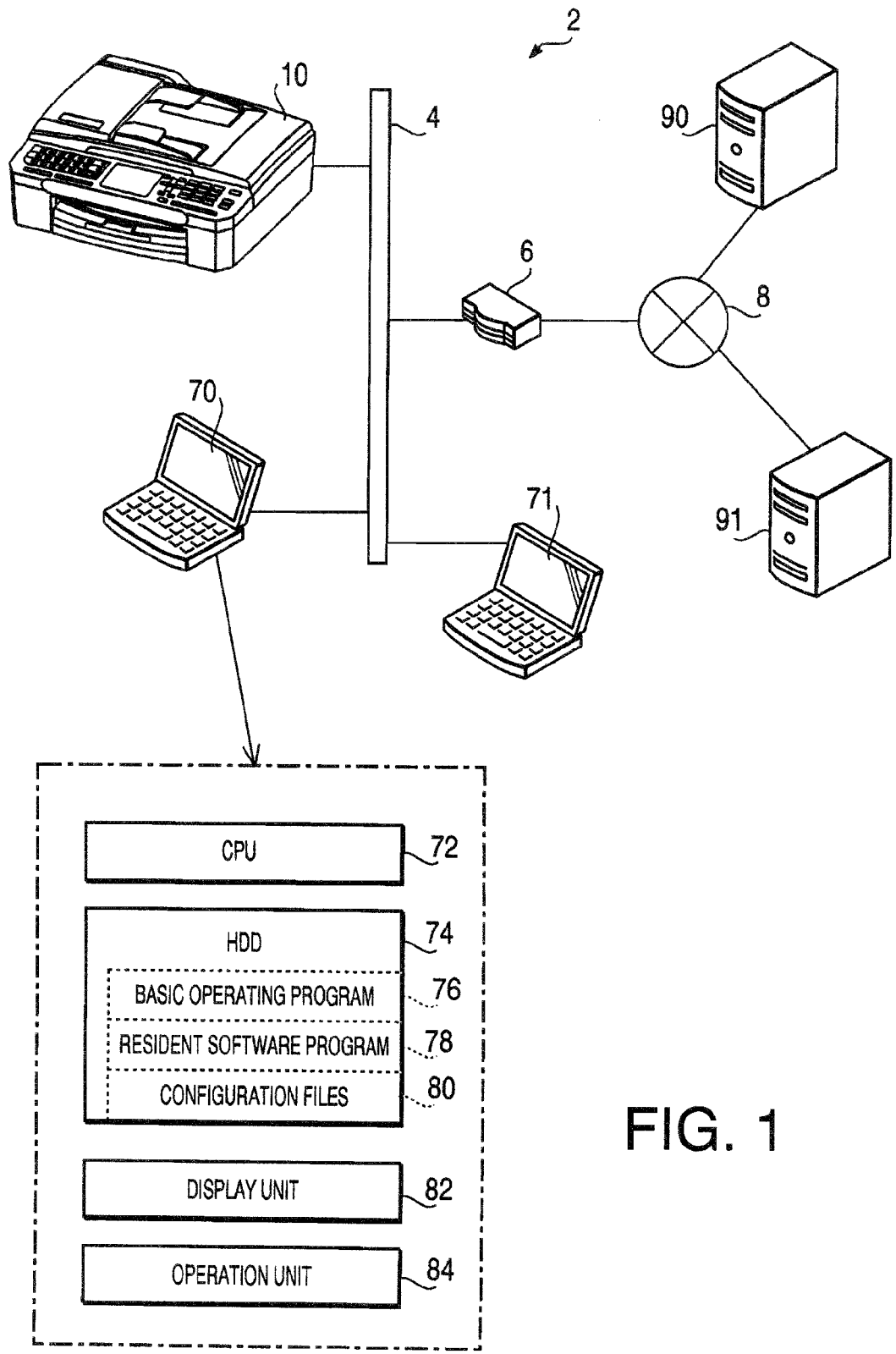
FIG. 1 is a schematic diagram to illustrate an MFP system according to an embodiment of the present invention.

Hereinafter, an embodiment according to an aspect of the present invention will be described with reference to the accompanying drawings. An MFP system 2 according to the present embodiment includes, as shown in FIG. 1, an MFP 10, a plurality of personal computers (PCs) 70, 71, and a plurality of content providing servers 90, 91. Numbers of the PCs and the content providing servers are not limited to two, but are variable.

The MFP 10 according to the present embodiment is a communication device connected to a local area network (LAN) 4 and provides a plurality of functions such as printing and scanning images, and making telephone calls. The LAN 4 is connected to the Internet 8 through an intervening router 6. The content providing servers 90, 91 are connected to the Internet 8. According to the present embodiment, the content providing server 90 provides an information site to public, whilst the content providing server 91 provides another information site to public. Each of the information sites includes a plurality of information contents. Further, each of the content providing servers 90, 91 stores feed information. The feed information is RSS-formatted information which includes summary of the information contents provided by the information site. The information stored in the information sites will be described later in detail.

Next, internal configuration of the PC 70 will be described. It is to be noted that the PC 71 is configured similarly to the PC 70; therefore detailed description of the PC 71 is represented by that of the PC 70. The PC 70 includes a CPU 72, a hard disk drive (HDD) 74, a display unit 82, and an operation unit 84. Further, the PC 70 is equipped with a network interface (not shown), which connects the PC 70 with the LAN 4.

The CPU 72 is processing unit to process various data according to basic program 76 and resident software program 78. The HDD 74 is a storage unit to store the program 76 and the resident software program 78 therein. The basic program 76 controls basic operations of the PC 70 and includes browser software for downloading contents from an information site in the Internet to display.

The resident software program 78 is a program to control the PC 70 to inform the MFP 10 of activation of the PC 70 itself and manipulates the PC 70 according to various instructions passed from the MFP 10. The resident software program 78 is installed in the MFP 10 via, for example, a computer readable medium. Alternatively, the resident software program 78 may be downloaded from an information providing site in the Internet 8 to be installed in the PC 70.

The HDD 74 stores a configuration file 80 therein. The configuration file 80 includes information concerning an IP address of the MFP 10. The configuration of the PC 70 in connection with the MFP 10 is set, for example, by a user.

The display unit 82 is capable of displaying various information concerning, for example, the PC 70 itself and the other devices. According to the present embodiment, the display unit 82 is equipped with a display screen, which is larger than a display panel 50 (FIG. 2) of the MFP 10. The operation unit 84 including a keyboard and a mouse is operated by the user in order to input various instructions and information.

Figure 2:
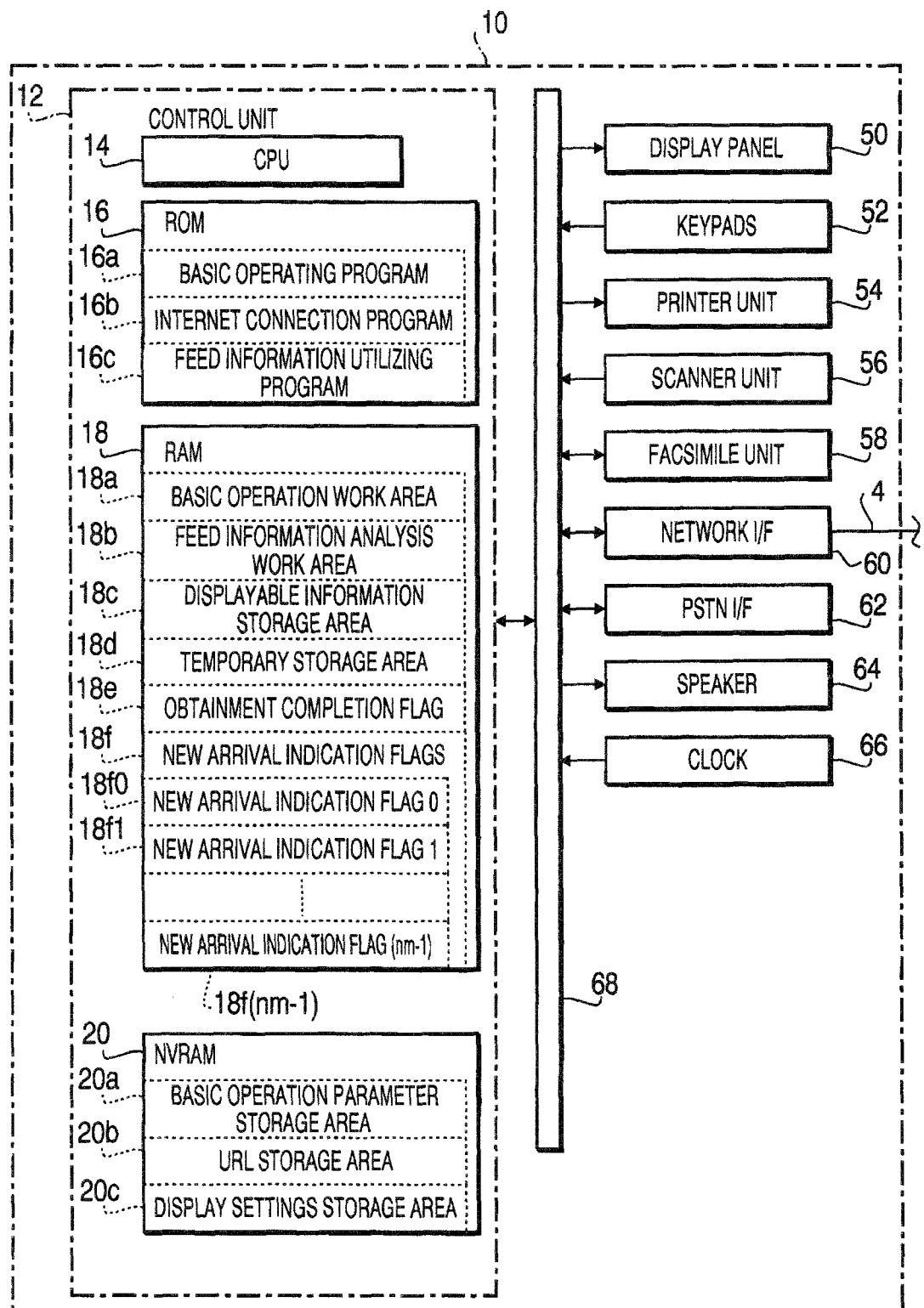
FIG. 2 is a block diagram to illustrate an electric configuration of the MFP according to the embodiment of the present invention.

Next, configuration of the MFP 10 will be described with reference to FIG. 2. The MFP 10 includes a control unit 12, the display panel 50, a keypad 52, a printer unit 54, a scanner unit 56, a facsimile unit 58, a network interface (I/F) 60, a PSTN interface (I/F) 62, and a speaker 64. The control unit 12 and the remaining of the above components 50-64 are connected with one another through a bus line 68. The control unit 12 includes a CPU 14, a ROM 16, a RAM 18, and an NVRAM 20.

The CPU 14 is a processing unit to process various data according to programs 16a-16c stored in the ROM 16. Data processing of the CPU 14 will be described later in detail with reference to FIGS. 6-11. The ROM 16 is a non-rewritable and non-volatile memory to store the programs 16a-16c.

The programs 16a-16c to be stored in the ROM 16 includes a basic operating program 16a, an internet connecting program 16b, and a feed information utilizing program 16c. The basic operating program 16a is a program to control basic behaviors of the MFP 10. The basic operating program 16a includes, for example, a program to generate display-usable data, by which images are reproduced in the display panel 50. The basic operating program 16a further includes programs to control behaviors of each of the unit components 50-66. The internet connecting program 16b is a program to connect the MFP 10 to the Internet 8. The feed information utilizing program 16c is a program to analyze feed information obtained from the contents providing server 90, 91 and create information (hereinafter, displayable information) to be displayed through the display panel 50, and displays the generated displayable information.

The RAM 18 is a rewritable volatile memory, which has memory areas 18a-18d and areas for setting flags 18e, 18f. The memory areas in the RAM 18 include a basic operation work area 18a, a feed information analysis work area 18b, a displayable information storage area 18c, and temporary storage area 18d. The basic operation work area 18a is a storage area to store various data being generated during the operations of the CPU 14 according to the basic operating program 16a. The feed information analysis work area 18b is a storage area to store various data being generated during the operations of the CPU 14 according to the feed information utilizing program 16c. The displayable information storage area 18c is a storage area to store the displayable information, which is generated based on the obtained feed information according to the feed information utilizing program 16c.

The temporary storage area 18d is a storage area to store the displayable information, having been stored in the displayable information storage area 18c, when new feed information is obtained. The CPU 14 stores the displayable information generated based on previously obtained feed information in the temporary storage area 18d. Further, the CPU 14 compares the newly obtained feed information stored in the displayable information storage area 18c with the previous displayable information stored in the temporary storage area 18d. Thus, judgment can be made to determine as to whether updated-content information 132 (see FIG. 4) included in the newly obtained feed information is new, and the CPU 14 can recognize and detect the newly obtained updated-content information 132. The updated-content information 132 according to the present embodiment includes a data set of a character string representing a title of the information contents (hereinafter, "content title 140") and content updated date 142. Further, the updated-content information 132 includes summary information 144 and an URL 146 of the information contents. The data set may further include the summary information 144 and the URL 146 of the information contents.

An obtainment completion flag 18e is set on in a predetermined area in the RAM 18 when the entire feed information, which can be provided through the URLs preset by the user, is obtained by the MFP 10. According to the present embodiment, The URLs of the content providing servers 90, 91 from which the feed information is to be obtained are set by the user. The obtainment completion flag 18e is cleared off when obtainment of the feed information corresponding to the preset URLs is incomplete.

A new arrival indication flag storage area 18f is an area to store settings of new arrival indication flags 18f0 through 18f(nm−1). The new arrival indication flags 18f0 through 18f(nm−1) are set on when the updated-content information 132 is newly obtained and character strings created according to the newly obtained content update information 132 have never been scroll-displayed in the display panel 50 (n and m are integers greater than or equal to 1). The new arrival indication flags 18f0 through 18f(nm−1) are set off when the character strings in the newly obtained updated-content information 132 are once displayed in a scrolling line in the display panel 50. The new arrival indication flags 18f0 through 18f(nm−1) are provided for each piece of updated-content information 132, and a number of the new arrival indication flags 18f0 through 18f(nm−1) corresponds to a number of pieces of updated-content information 132. The number of pieces of content updating information is equivalent to a number of information contents to be provided through an information site of each information providing server 90, 91.

According to the MFP 10 of the present embodiment, each URL from which the feed information is obtained is assigned a number, which is one of 0 through n−1 (n is an integer greater than or equal to 1). Therefore, a number n of the URLs are stored in the URL storage area 20b (see FIG. 3B). Further, each URL in the storage area 20b is associated with a piece of updated-content information 132, which is stored in the displayable information storage area 18c. Each piece of updated-content information 132 is assigned a number, which is one of 0 through m−1 (m is an integer greater than or equal to 1). Therefore, m pieces of updated-content information 132 are stored in the displayable information storage area 18c (see FIG. 4). Accordingly, the number n*m of the new arrival indication flags 18f0 through 18f(nm−1) are prepared in the new arrival indication flag storage area 18f. In the present embodiment, usage of the new arrival indication flags 18f0 through 18f(mn−1) is determined according to a number of pieces of updated-content information 132 stored in the displayable information storage area 18c. For example, when one URL is stored in the URL storage area 20, and when two pieces of updated-content information 132 are generated according to the feed information obtained from the location indicated by the URL, three the new arrival indication flags 18f0 through 18f2 are used while the remaining new arrival indication flags 18f3 through 18f(nm−1) are kept unused.

The NVRAM 20 is a rewritable non-volatile memory and includes a basic operation parameter storage area 20a, a URL storage area 20b, and a display settings storage area 20c. The basic operation parameter storage area 20a is a storage area to store parameters to be used during the operations of the CPU 14 according to the basic operating program 16a. The parameters may be, for example, settings concerning printing and settings concerning scanning.

The URL storage area 20b is a storage area to store URLs, from which the feed information stored in the content providing servers 90, 91 is obtained. Further, time settings to display information generated according to the feed information obtained from the URLs are stored. In particular, display starting time, at which character strings such as the content titles 140 generated according to the feed information starts being displayed, and display completion time, at which display of the character strings is completed, are stored. The character strings generated based on the obtained feed information are displayed in a scrolling line within a period defined by the display starting time and the display completion time.

For example, the user of the MFP 10 is required to set the URLs, the display starting time, and the display completion time in order to receive the content services from the content providing servers 90, 91. These settings may be entered through an interface presented through the display panel 50 in an information site setting process, which will be described later. The entered settings are stored in the URL storage area 20b. The interface for entering the settings will be described later in detail.

The settings for receiving the content services may be entered through the PCs 70, 71 alternatively to the interface presented through the display panel 50 of the MFP 10. When the settings are entered through the PC 70 to receive the content service from the content providing server 90, for example, the URLs from which the feed information of the content providing server 90 is obtained, the display starting time, and the display completion time are passed to the MFP 10 from the PC 70. Thus, the settings entered through the PC 70 can be stored in the URL storage area 20b of the MFP 10.

Alternatively to the display starting time and the display completion time, limited-display starting time, at which the character strings such as the content title 140 generated according to the feed information starts being scroll-displayed, and limited-display completion time, at which scroll-display of the character strings is stopped, can be set in the URL storage area 20b. When the limited-display starting time and the limited-display completion time are set in the URL storage area 20b, only the data set including the content title 140 and content updated date 142 stored in the displayable information storage area 18c and adaptable to be displayed in a time period defined by the limited-display starting time and the limited-display completion time can be displayed in the scrolling line rather than having the entire information stored in the displayable information storage area 18c to be scroll-displayed.

The display settings storage area 20c is a storage area to store a maximum allowable number of data sets to be displayed in a scrolling line in the display panel 50. The display settings storage area 20c further stores a display setting option, which is either "fixed" or "variable" for newly obtained updated-content information 132. A number of sets of newly obtained data in the updating information 132 to be displayed on basis of the URL can be either fixed or variable. Further, the display settings storage area 20c stores an interval setting, in which the feed information is updated periodically. These settings can be entered through a user interface which is presented to the user through the display panel 50 when a display settings entry process is performed. The display settings entry process and the user interface to be presented to the user will be described later in detail. The display settings for displaying the data sets may be entered through the PCs 70, 71 alternatively to the interface presented through the display panel 50 of the MFP 10, similarly to the information site settings stored in the URL storage area 20b.

The display panel 50 is a display device to output various information for the user to view. The According to the present embodiment, a display screen of the display panel 50 is smaller than the screen of the display unit 82 in the PCs 70, 71. Further, the display panel 50 in the present embodiment is a touch-sensitive panel, through which the user's instructions can be entered. The keypad 52 includes a plurality of keys, which can be manipulated by the user to enter various instructions and information in the MFP 10. The printer unit 54 is equipped with a printing mechanism to form images on recording media in printing methods such as inkjet-printing or laser-printing. The scanner unit 56 is equipped with a reading mechanism such as a CCD or CIS. The facsimile unit 58 is configured to communicate with other external facsimile machine to transmit and receive images. The network interface 58 connects the MFP 10 with the LAN 4. Therefore, the MFP 10 is capable of communicating with the PCs 70, 71 and accessing the Internet 8. The PSTN interface 62 connects the MFP 10 with a PSTN (Public Switched Telephone Network) (not shown). Facsimile and telephone communications are established through the PSTN. The speaker 64 generates a calling sound when an incoming call reaches the MFP 10. A clock 66 is an instrument to register current time.

Next, an interface to enter information sites and contents to be stored in the URL storage area 20b will be described with reference to FIGS. 3A, 3B. An information site entry window shown in FIG. 3A includes URL entry fields 50a1 through 50an. A number n of URLs of the information contents to be provided by the content providing servers 90, 91 can be entered in the URL entry fields 50a1 through 50an. The information site entry window further includes display starting time entry fields 50b1 through 50bn. The display starting times entered in the display starting time entry fields 50b1 through 50bn correspond respectively to the URLs entered in the URL entry fields 50a1 through 50an. The character strings generated according to the feed information, which is obtained through the URLs entered in the URL entry fields 50a1 through 50an, start being displayed at the time defined by the display starting times entered in the corresponding display starting time entry fields 50b1 through 50bn. The information site entry window further includes display completion time entry fields 50c1 through 50cn. The display completion times entered in the display completion time entry fields 50c1 through 50cn correspond respectively to the URLs entered in the URL entry fields 50a1 through 50an and to the display starting times entered in the display starting time entry fields 50b1 through 50bn. The character strings started being displayed according to the display starting times entered in the display starting time entry fields 50b1 through 50bn are stopped being displayed at the time defined by the display completion times entered in the corresponding display completion time entry fields 50c1 through 50cn.

The user enters the URLs, the display starting times and the display completion times for the character strings corresponding to the URL through the keypads 52. When the user confirms the entries by pressing an OK button 50d in the display panel 50, the entered information is stored in the URL storage area 20b. The entries of the information are canceled when the user presses a cancel button 50e in the display panel 50.

Next, data to be stored in the URL storage area 20b will be described with reference to FIG. 3B. The URL storage area 20b is a storage area to store the URLs 102 indicating locations, from which the feed information of the content providing servers 90, 91 is to be obtained, as entered in the URL entry fields 50a1 through 50an in the information site entry window (see FIG. 3A). Further, the URL storage area 20b stores the display starting times and the display completion times as entered in the display starting time entry fields 50b1 through 50bn and the display completion time entry fields 50c1 through 50cn respectively (see FIG. 3A). Thus, each of the URLs 102, the display starting time and the display completion time corresponding to the URL 102 are stored to make a set in the URL storage area 20b. In FIG. 3B, the URL storage area 20b stores n pieces of URLs 102, the display starting times, and the display completion times therein. Each set of the URL 102, the display starting time, and the display completion time in the URL storage area 20b is provided with an identification number 100. In the present embodiment, the identification number 100 is represented by a sign "i."

According to the settings of the display starting time and the display completion time for the URL 102, a time period, in which the feed information including the character strings to be displayed can be utilized, can be adjusted.

Figure 4:
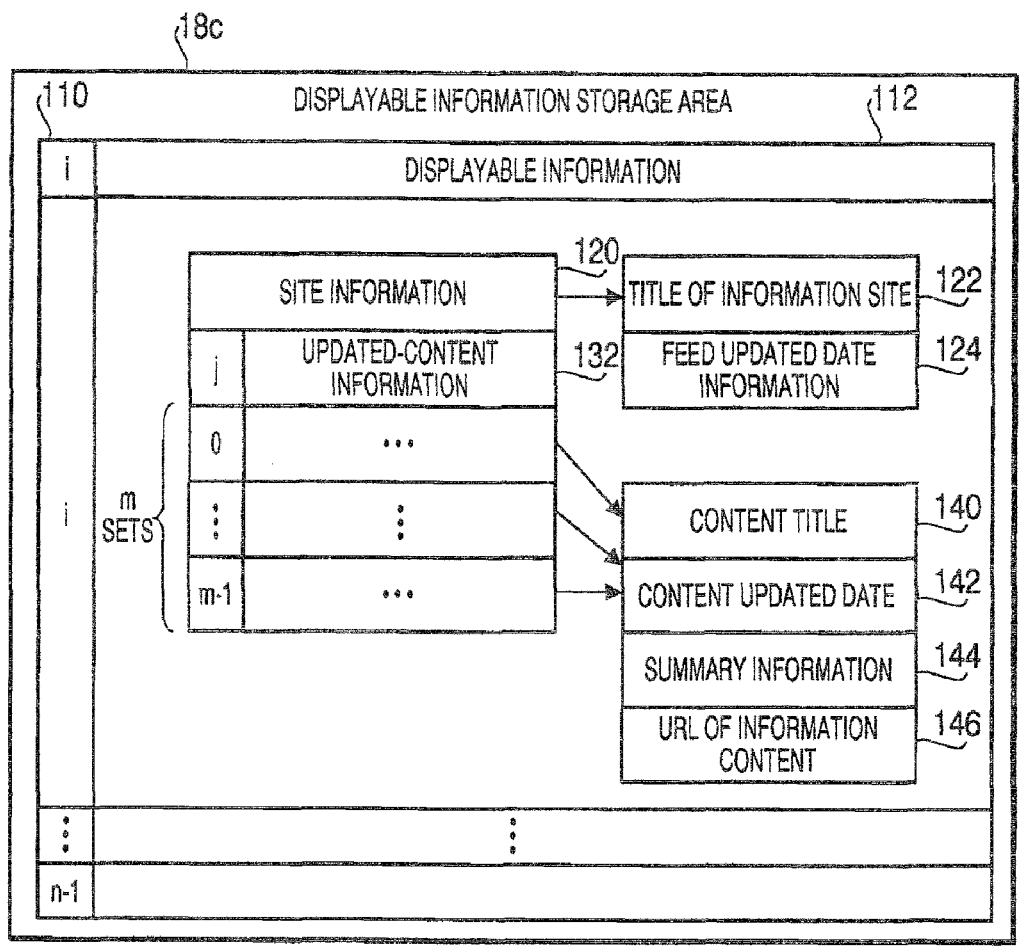
FIG. 4 illustrates a data structure of displayable information stored in a displayable information storage area in the RAM of the MFP according to the embodiment of the present invention.

Next, data to be stored in the displayable information storage area 18c will be described with reference to FIG. 4. The displayable information storage area 18c is an area to store displayable information 112 for each URL 102 stored in the URL storage area 20b. The URL storage area 20b includes n pieces of URLs. In this regard, n is an integer greater than or equal to 1. Accordingly, the displayable information storage area 18c stores n pieces of displayable information 112 as well. Each piece of displayable information 112 is provided with identification information 110. The identification information 110 in the displayable information storage area 18c and the identification number 100 in the URL storage area 18b are identical. Therefore, the identification information 110 is also represented by the sign "i."

Next, a data structure of the displayable information 112 will be described. The displayable information 112 includes a piece of site information 120. The site information 120 includes a character string 122 and feed updated date information 124. The character string 122 represents a title of the information site. The feed updated date information 124 is information concerning an updated date in which the feed information in the content providing servers 90, 91 is lately updated.

The displayable information 112 includes at least one piece of updated-content information 132. A number of pieces of updated-content information 132 is equal to a number of pieces of information contents provided from the information site. In the example shown in FIG. 4, the displayable information 112 with the identification number (i) 100 being 0 (zero) includes m pieces of updated-content information 132. In this regard, m is an integer greater than or equal to 1. Therefore, the information site with the identification number being 0 includes m pieces of information contents. For example, when an information site provides a piece of information content concerning weather news and a piece of information content concerning sports news, the displayable information 112 of the information site includes two pieces of updated-content information 132. Each piece of updated-content information 132 is identified by an identification number 130. In the present embodiment, the identification number 130 is represented by a sign "j."

The updated-content information 132 includes a data set of a character string 140 representing a title of the information contents (hereinafter, "content title 140") and content updated date 142, summary information 144, and an URL 146 of the information contents. Thus, when the updated-content information 132 is newly obtained, the content title 140, the content updated date 142, the summary information 144, and the URL 146 of the information contents are new as well. That is, newness of the content title 140, the content updated date 142, the summary information 144, and the URL 146 of the information contents can be determined based on the newness of the updated-content information 132. According to the present embodiment, the CPU 14 stores the newly obtained updated-content information 132 in an ascending order based on the identification number 130 of the updated-content information 132 (i.e., the updated-content information 132 with the identification number 130 being j=0 is stored in a highest position whilst the updated-content information 132 with the identification information 130 being j=m−1 is stored in a lowest position).

According to the above-mentioned example, each of the updated-content information 132 for the information content concerning the weather news and the updated-content information 132 for the information content concerning the sports news includes the above-described data set including the information 140, 142, 144, 146 respectively. The content title 140 represents a title of the information content. The content updated date 142 is information concerning an updated date in which the information contents are updated in the content providing servers 90, 91 at latest. The summary information 144 includes character strings representing information which summarizes the information in the content to be provided from the information site. The summary information 144 therefore generally includes a greater number of character strings than the character string in the content title 140. Meanwhile, the number of character strings in the summary information 144 is smaller than a number of character strings included in the information content. The URL 146 of the information contents indicates a location of the information contents. In the MFP 10 according to the present embodiment, the content title 140 is displayed in a scrolling horizontal line (so-called ticker display) in the display panel 50. Additionally, the content updated date 142 and the URL 146 of the information contents may be displayed in scrolling horizontal lines in the display panel 50.

Figure 5:
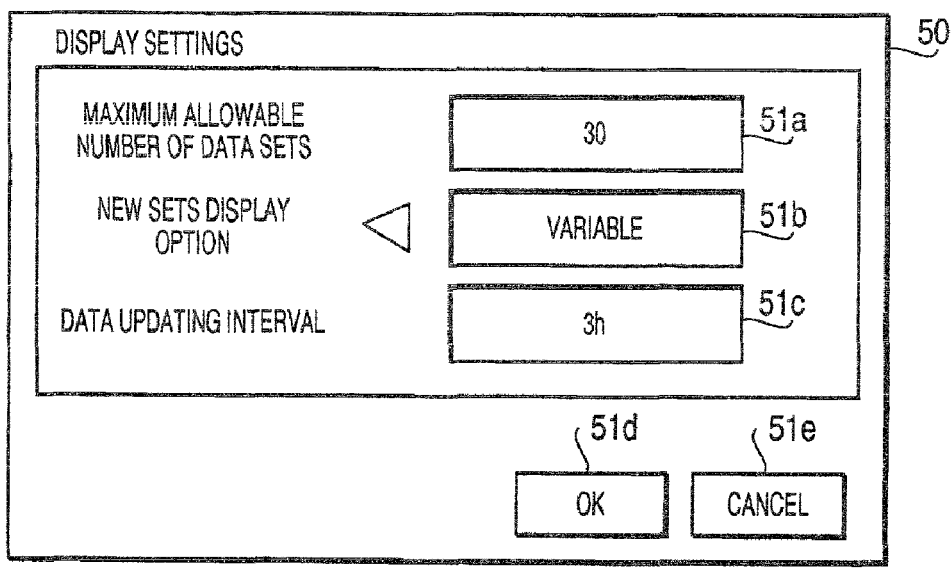
FIG. 5 illustrates a display settings entry interface to be presented to the user through the display panel of the MFP according to the embodiment of the present invention.
Figure 6:
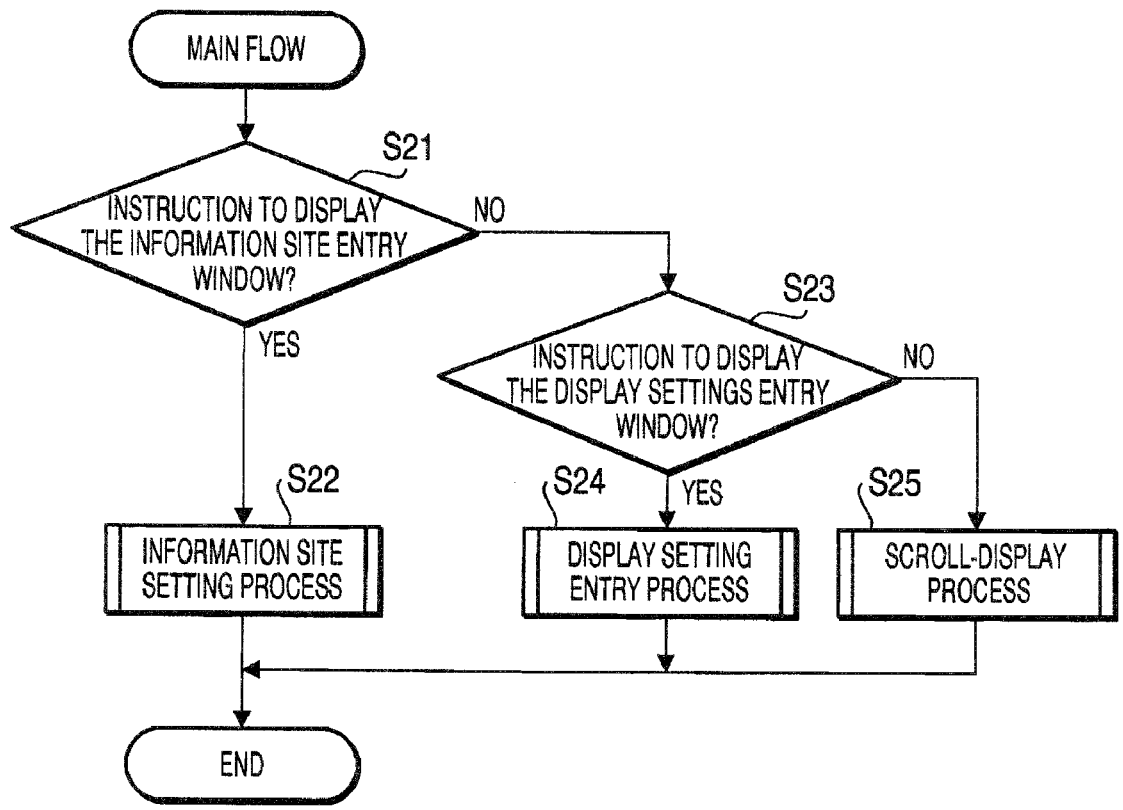
FIG. 6 is a flowchart to illustrate a main flow of the MFP according to the embodiment of the present invention.

Next, an interface to enter display settings will be described with reference to FIG. 5. A display settings entry window as shown in FIG. 5 is presented to the user through the display panel 50 of the MFP 10. The display settings entry window includes a maximum number entry field 51*a*, a new sets display option entry field 51*b*, and a data updating interval entry field 51*c*. The maximum number entry field 51*a* is to enter a maximum allowable number of sets to be displayed. The maximum allowable number of sets refers to a number of data sets including the information 140, 142, 144, 146 to be displayed in a scrolling line in the display panel 50. In the present embodiment, the maximum allowable number of sets of the information 140, 142, 144, 146 to be displayed in a scrolling line is 30. The new sets display option entry field 51*b* is to enter an option of a display setting for newly obtained updated-content information 132. A number of pieces of newly obtained data sets in the updating information 132 to be displayed on basis of the URL can be either fixed or variable. In the present embodiment, an option "variable" is entered. Therefore, the number of data sets of the newly obtained information 140, 142, 144, 146 to be displayed can be incremented so that a larger number of pieces of newly obtained information 140, 142, 144, 146 can be displayed in the scrolling line flexibly.

When an option "fixed" is entered in the new sets display option entry field 51*b*, the newly obtained updated-content information 132 is displayed in the scrolling line, and the number of data sets of updated-content information 132 to be displayed is controlled according to a predetermined number of sets per URL, even though the number of newly obtained sets of updated-content information 132 for each URL may vary. On the other hand, when the option "variable" is set, the number of sets of updated-content information 132 to be scroll-displayed can be varied and adjusted among the URLs. Thus, the number of sets of information included in the newly obtained updated-content information 132 can be incremented so that the incremented number of pieces of information in the newly obtained updated-content information 132 can be scroll-displayed adjustably.

The data updating interval entry field 51*c* is to enter an interval to obtain the feed information. In the present embodiment, "3 h" representing three hours is entered. Therefore, the feed information is obtained at every three hour. Thus, each of the maximum allowable number of sets, the set number option to be displayed for the newly obtained information, and the data updating interval are stored to make a set in the display settings storage area 20*c*. When the user confirms the entries by pressing an OK button 51*d* in the display panel 50, the entered information is stored in the display settings storage area 20*c*. The entries of the settings are canceled when the user presses a cancel button 51*e* in the display panel 50.

Next, the processes to be executed by the CPU 14 of the MFP 10 will be described with reference to FIGS. 6-11. A main flow of a process to be executed by the CPU 14 of the MFP 10 will be described with reference to FIG. 6. The main flow starts when the MFP 10 is powered on. The main flow is repeated as long as the MFP 10 is maintained active.

When the main flow starts, in S21, the CPU 14 determines as to whether a user's instruction to display the information site entry window (see FIG. 3A) is entered through the keypads 52. The information site entry window is the user interface through which the URLs and the settings to receive the content services from the content providing servers 90, 91 are entered. When once entered, the instruction is stored in a predetermined area of the RAM 18. Therefore, in S21, the CPU 14 determines entry of the instruction based on the data stored in the predetermined area of the RAM 18.

In S21, when the instruction for the information site entry window is entered (S21: YES), in S22, the CPU 14 performs an information site setting process. When no instruction for the information site entry window is entered (S21: NO), in S23, the CPU 14 determines as to whether an instruction to display the display settings entry window (see FIG. 5) is entered through the keypads 52. The display settings entry window is the user interface through which the options of the numbers of sets of information to be displayed are entered.

In S23, when the instruction for the display settings entry window is entered (S23: YES), in S24, the CPU 24 performs a display settings entry process. When no instruction for the display settings entry window is entered (S24: NO), in S25, the CPU 14 performs a scroll-display setting process. Following one of S22, S24, and S25, the main flow is completed.

Figure 7:
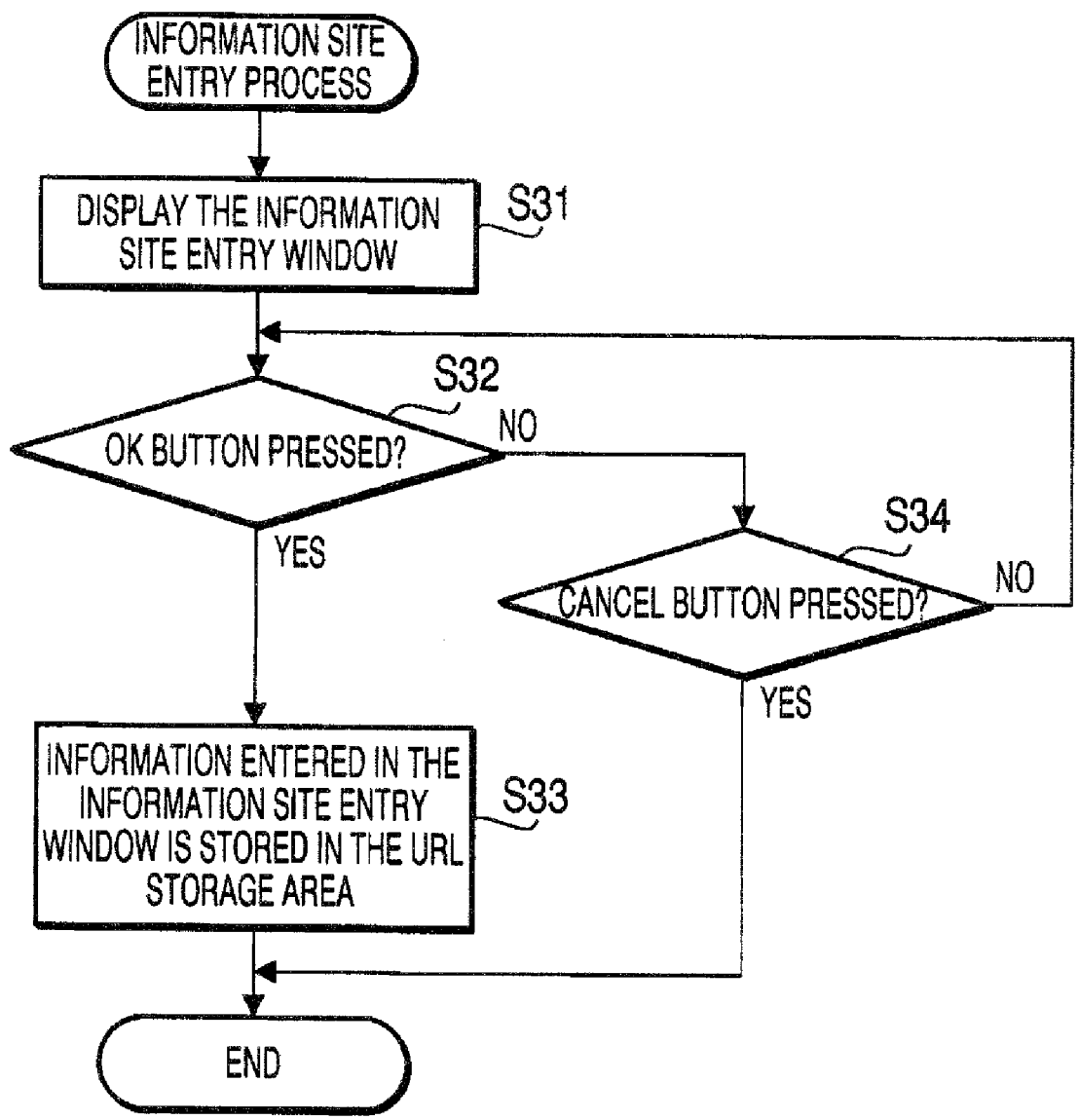
FIG. 7 is a flowchart to illustrate an information site entry process to be performed in the MFP according to the embodiment of the present invention.

Next, the information site setting process will be described with reference to FIG. 7. When the process starts, in S31, the CPU 14 displays the information site entry window (see FIG. 3A) in the display panel 50. When the information site entry window is displayed, the user can enter URLs of the information providing sites from which the content services are provided in the URL entry fields 50*a*1-50*an* through the keypads 52. Further, the display starting times and the display completion times for the respective URLs can be entered in the starting time entry fields 50*b*1-50*bn* and the completion time entry fields 50*c*1-50*cn* through the keypads 52.

In S32, the CPU 14 determines as to whether the OK button 50*d* has been pressed. If the OK button 50*d* has been pressed (S32: YES), in S33, the URLs entered in the URL entry fields 50*a*1-50*an*, the display starting times entered in the starting time entry fields 50*b*1-50*bn*, and the display completion times entered in the completion time entry fields 50*c*1-50*cn* are stored in the URL storage area 20*b*. The process is ended thereafter. Meanwhile, if the OK button 50*d* has not been pressed (S32: NO), in S34, the CPU 14 determines as to whether the cancel button 50*e* has been pressed. If the cancel button 50*e* has not been pressed (S34: NO), the CPU 14 returns to S32. If the cancel button 50*e* has been pressed (S34:

YES), the process is ended. When the process completes, display of the information site entry window is ceased.

Figure 8:
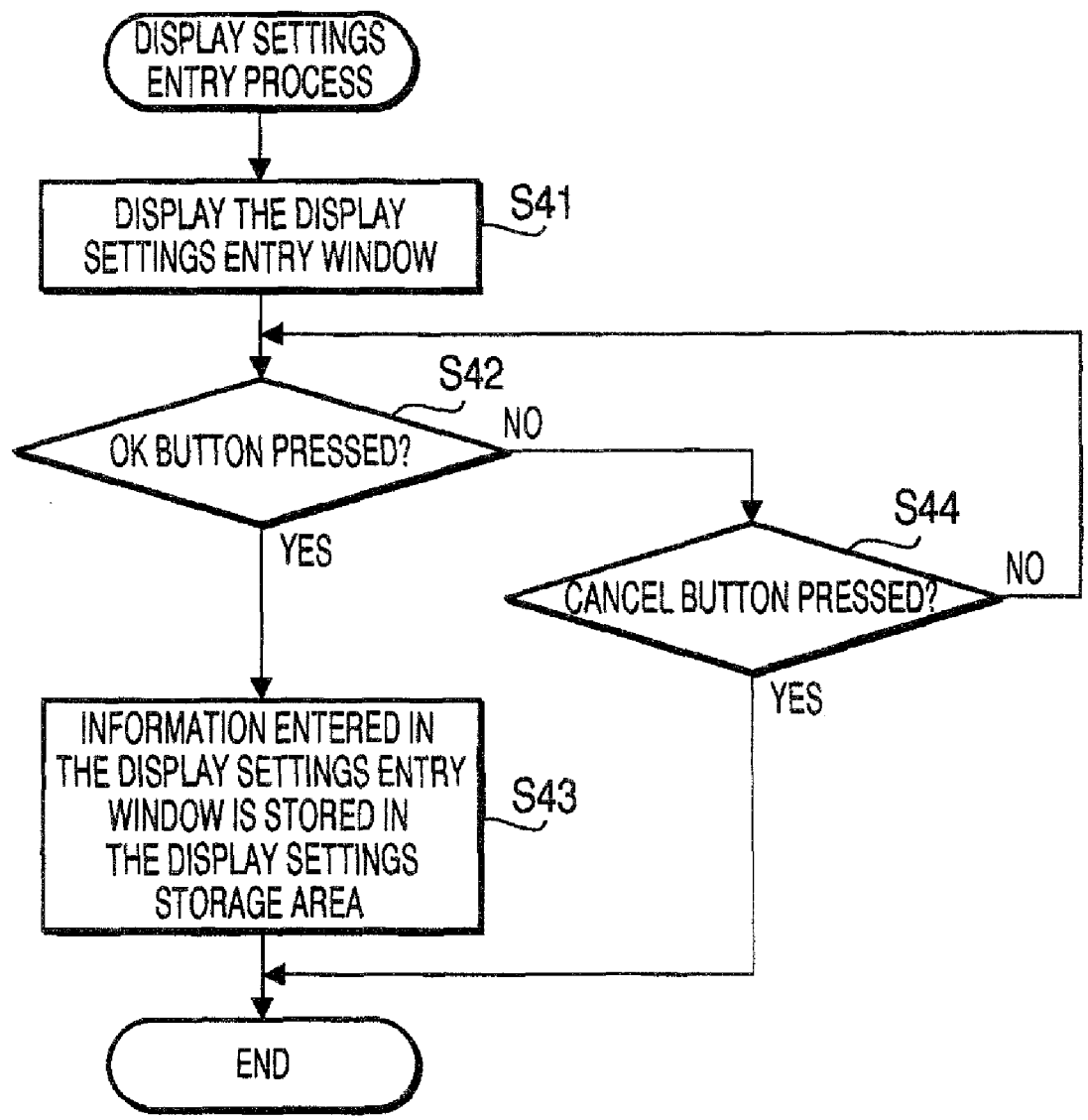
FIG. 8 is a flowchart to illustrate a display settings entry process to be performed in the MFP according to the embodiment of the present invention.

Next, the display settings entry process will be described with reference to FIG. 8. When the process starts, in S41, the CPU 14 displays the display settings entry window (see FIG. 5) in the display panel 50. When the display settings entry window is displayed, the user can enter the maximum allowable number of sets of information in the maximum number entry field 51a through the keypads 52. Further, the option of display setting, i.e., "fixed" or "variable," and the data updating interval are entered in the display starting times and the display completion times for the respective URLs can be entered in the new sets display option entry field 51b and the data updating interval entry field 51c through the keypads 52.

In S42, the CPU 14 determines as to whether the OK button 51d has been pressed. If the OK button 51d has been pressed (S42: YES), in S43, the information entered in the maximum number entry field 51a, the new sets display option entry field 51b, and the data updating interval entry field 51c is stored in the display settings storage area 20c. The process is ended thereafter.

Meanwhile, if the OK button 51d has not been pressed (S42: NO), in S44, the CPU 14 determines as to whether the cancel button 51e has been pressed. If the cancel button 51e has not been pressed (S44: NO), the CPU 14 returns to S42. If the cancel button 51e has been pressed (S44: YES), the process is ended. When the process ends, display of the information site entry window is ceased.

Figure 9:
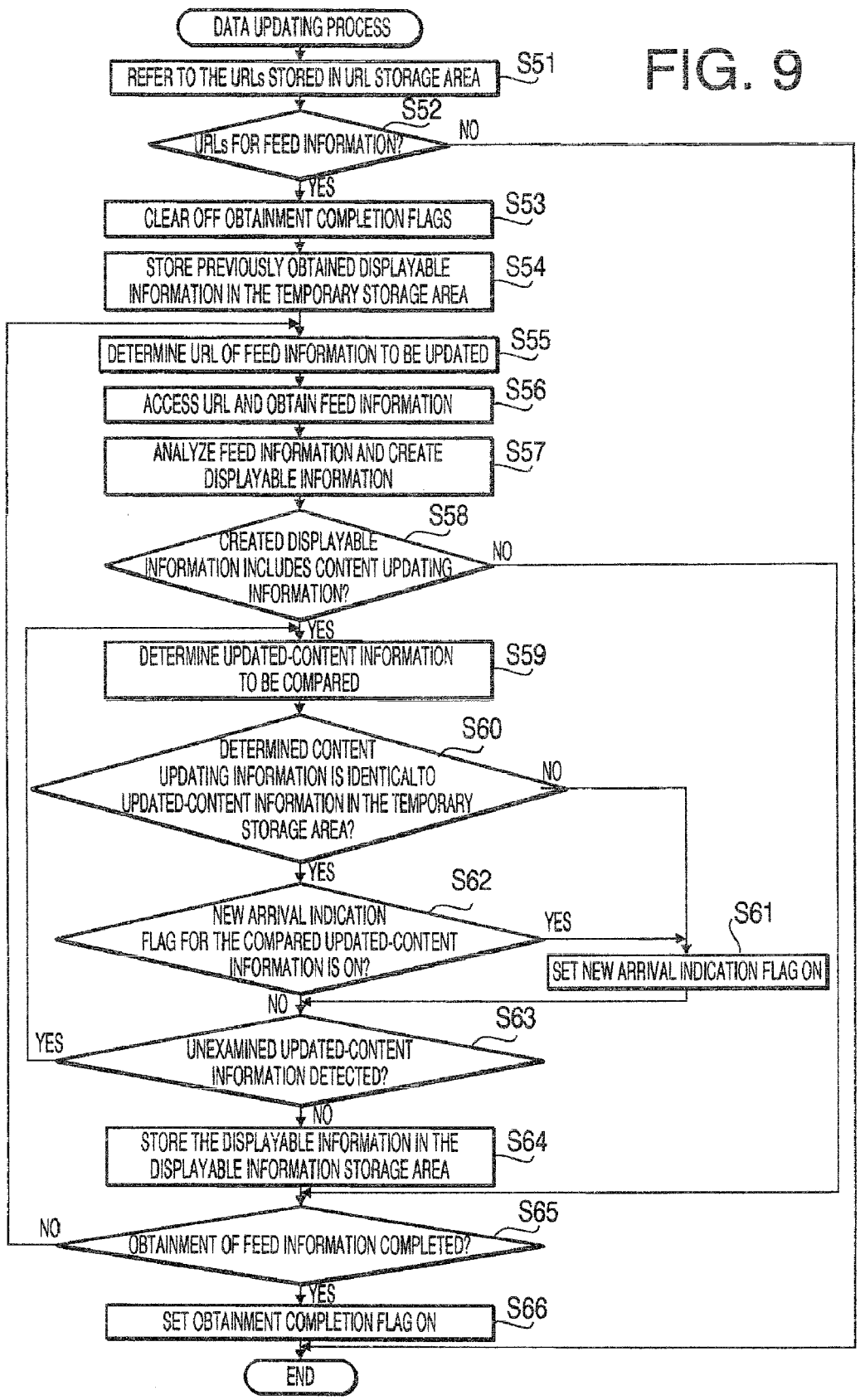
FIG. 9 is a flowchart to illustrate a data updating process to be performed in the MFP according to the embodiment of the present invention.

Next, a data updating process will be described with reference to FIG. 9. In the data updating process, feed information is obtained based on the entered URLs, the information in the displayable information storage area 18c is updated, and newly obtained updated-content information 132 to be displayed is determined. The data updating process starts when the MFP 10 is powered on and is repeated as long as the MFP 10 is maintained active.

When the data updating process starts, in S51, the CPU 14 refers to the information stored in the URL storage area 20b. In S52, the CPU 14 examines the URL storage area 20b and judges as to whether URLs of locations from which feed information is to be obtained is stored in the URL storage area 20b. In S52, if no URL to obtain feed information is stored in the URL storage area 20b (S52: NO), the CPU 14 cannot obtain any feed information to update the information in the displayable information storage area 18c; therefore, the CPU 14 terminates the process.

In S52, when URLs to obtain feed information is stored in the URL storage area 20b (S52: YES), in S53, the CPU 14 clears off the obtainment completion flags 18e. The obtainment completion flags 18e being off indicates incomplete obtainment of the feed information corresponding to the URLs stored in the URL storage area 20b. In S54, the CPU 18 stores the displayable information 112 generated based on the previously obtained feed information, which is stored in the displayable information storage area 18c, in the temporally storage area 18d.

In S55, the CPU 14 determines feed information to be updated and a URL corresponding to the determined feed information. In particular, the CPU 14 determines the identification number 100 (i) of the displayable information 112 to be updated. In the present embodiment, the CPU 14 determines the URL having a smallest number for the identification number 100, i.e., i=0 for the first determination, to be the URL for the feed information to be updated.

In S56, the CPU 14 connects the MFP 10 to the URL determined in S55 through the network interface 60 and obtains latest feed information. In S57, the CPU 14 analyzes the obtained feed information and generates displayable information 112 based on the obtained feed information, which includes the site information 120 and the updated-content information 132 (see FIG. 4). The generated displayable information 112 is stored in the displayable information storage area 18c in association with the URL being the source of the feed information.

In S58, the CPU 14 judges as to whether the displayable information 112 generated in S57 includes updated-content information 132. When no updated-content information 132 is included (S58: NO), the flow proceeds to S65. When the updated-content information 132 is included (S58: YES), in S59, the CPU 14 determines a piece of updated-content information 132, among the content updating information in the displayable information 112 generated in S57, to be compared with the updated-content information 132 stored in the temporary storage area 18d in order to judge as to whether the updated-content information 132 found in S58 is newly obtained updated-content information 132.

In S60, the CPU 14 judges as to whether the updated-content information 132 determined in S59 is identical to the compared updated-content information 132 in the temporary storage area 18d. In S60, when the updated-content information 132 determined in S59 is not identical to the compared updated-content information 132 stored in the temporary storage area 18d (S60: NO), it is judged that the content updating information determined in S59 is newly obtained. Therefore, in S61, the CPU 14 sets the new arrival indication flag 18f for the content updating information on. The flow proceeds to S63.

In S60, when the updated-content information 132 determined in S59 is identical to the compared updated-content information 132 in the temporary storage area 18d (S60: YES), in S62, the CPU 14 judges as to whether the new arrival indication flag 18f for the compared updated-content information 132, which is stored in the temporary storage area 18d, is on. It is to be noted that, even when the compared updated-content information 132 in the temporary storage area 18d is identical to the updated-content information 132 determined in S59, the new arrival indication flag 18f for the compared updated-content information 132 can be set on if information in the former updated-content information 132 in the temporary storage area 18d has never been displayed in the scrolling line. Therefore, in S62, previously obtained and new updated-content information 132 can be detected.

In S62, when the new arrival indication flag 18f for the compared updated-content information 132, stored in the temporary storage area 18d, is on (S62: YES), it is judged that the updated-content information 132 determined in S59 is equally new. Therefore, in S66, the new arrival indication flag 18f for the updated-content information 132 determined in S59 is set on. The flow proceeds to S63.

In S62, when the new arrival indication flag 18f for the compared updated-content information 132, stored in the temporary storage area 18d, is off (S62: NO), in S63, the CPU 14 judges as to whether the displayable information 112 generated in S57 includes unexamined updated-content information 132, which has not been processed through S59-S62. When unexamined updated-content information 132 is detected (S63: YES), the flow returns to S56. When no unexamined updated-content information 132 is detected (S63: NO), in S64, the CPU 14 stores the displayable information 112 generated in S57 in the displayable information storage area 18c. For example, when the displayable information 112 is generated based on the feed information obtained from the URL with the identification number 0 (i=0) in S57, the CPU 14 deletes the older displayable information 112 with the identification number 0 (i=0) and stores the displayable information 112 generated in S57 in place in S64.

In S65, the CPU 14 judges as to whether obtainment of the feed information from the locations indicated by all the URLs stored in the URL storage area 20b is completed. When obtainment of the feed information is completed (S65: YES), the CPU 14 sets the obtainment completion flag 18e on. The flow ends thereafter.

In S65, the CPU 14 determines completion of obtainment of feed information based on the identification number 100 (i) determined in S55. In particular, when the identification number 100 (i) has not reached the maximum value, i.e., n−1, at least one of the URLs stored in the URL storage area 20b remains to be used to obtain the feed information thereby. Meanwhile, when the identification number 100 (i) indicates the maximum value, i.e., n−1, it is judged that obtainment of the feed information is completed.

In S65, when it is judged that obtainment of the feed information is incomplete (S65: NO), the flow returns to S55. In S55, the CPU 14 determines feed information to be updated and a next URL corresponding to the feed information. In this regard, the CPU 14 increments the identification number (i) by one so that the next URL corresponding to the feed information to be updated is determined.

Thus, according to the data updating process, the feed information can be obtained based on the URLs specified by the user, and the information in the displayable information storage area 18c can be updated. Further, in this regard, the newly obtained updated-content information 132 can be detected.

Next, a scroll-display process will be described with reference to FIG. 10. In the scroll-display process, the character strings in the content title 140 and the content updated date 142 are presented in a scrolling line and displayed in the display panel 50 of the MFP 10.

When the scroll-display process starts, in S71, the CPU 14 performs a flow to determine a number of sets of information to be displayed (a displayable set number determining process), which will be described with reference to FIG. 11.

When the displayable set number determining process starts, in S91, the CPU 14 judges as to whether the obtainment completion flag 18e is set on. When the obtainment completion flag 18e is off (S91: NO), it is determined that the latest feed information has not been obtained, i.e., the displayable information 112 has not been updated. The CPU 14 terminates the flow thereafter.

When the obtainment completion flag 18e is on (S91: YES), it is determined that the latest feed information has been obtained, i.e., the displayable information 112 has been updated. Therefore, in S92, the CPU 14 sets the obtainment completion flag 18e off. In S93, the CPU 14 refers to the clock 66 and obtains current time. In S94, the CPU 14 refers to the display starting times and the display completion times stored in the URL storage area 20b and judges as to whether the current time obtained in S93 is included in any time ranges defined by the display starting times and the display completion times. Thus, when the current time is included in any of the time ranges, it is determined that the data set included in the feed information, which was obtained through the URL corresponding to the time range, is to be scroll-displayed. When no data set is to be displayed (S94: NO), in S95, the number of data sets to be displayed for each URL stored in the URL storage area 20b is set to zero.

The behaviors of the CPU 14 in S94-S95 will be described with reference to an example shown in FIG. 12A. In FIG. 12A, the URL with the identification number 100 being zero (i.e., i=0) is provided with the display starting time "6:00" and the display completion time "15:00." The URL with the identification number 100 being one (i.e., i=1) is provided with the display starting time "12:00" and the display completion time "18:00." The URL with the identification number 100 being two (i.e., i=2) is provided with the display starting time "12:00" and the display completion time "21:00." Thus, no URL having data sets to be displayed during a time range between 21:00 and 6:00 is included in the URL storage area 20b. Therefore, when the current time is within the time range between 21:00 and 6:00, in S94, the CPU 14 determines that no data set to be displayed exists for any of the URLs stored in the URL storage area 20b. Accordingly, the CPU 14 sets the number of sets to be displayed for each URL to be zero, and no character string is scroll-displayed in the display panel 50.

Description of FIG. 11 is continued. In S94, when the CPU 14 detects a data set to be scroll-displayed (S94: YES), in S96, the CPU 14 refers to the current time and the information stored in the URL storage area 20b in order to detect a number of URLs having the data sets to be scroll-displayed. In S97, the CPU 14 divides the maximum allowable number of sets to be displayed, which was entered in the maximum number entry field 51a and stored in the display settings memory 20c, by the number of URLs detected in S96. Further in S97, the quotient is set to be the number of data sets to be displayed and assigned to each URL having the data sets to be displayed. Meanwhile, the URLs having no data set to be currently displayed are assigned a number of displayable sets being zero. In S98, the CPU 14 refers to the new sets display option stored in the display settings storage area 18c and judges as to whether the option is "variable." When the new sets display option is "fixed" (S98: NO), the CPU 14 sets the number of displayable sets determined in S97 to be the number of data sets to be scroll-displayed for each URL having the data sets to be displayed. The displayable data set number determining process ends thereafter.

The behaviors of the CPU 14 when negative judgment is made in S98 will be described with reference to an example shown in FIG. 12B. In the present example, the maximum allowable number of data sets to be displayed stored in the display settings storage area 20c is 30. Further, the new sets display option is "fixed."

According to the example shown in FIG. 12, the data sets to be displayed during the time range between 6:00-11:59 are those included in the feed information obtained through solely the URL with the identification number 100 being 0 (i.e., i=0) (S94). Therefore, in S96, the CPU 14 determines the number of URL having the data sets to be displayed is 1. In S97, the CPU 14 divides the maximum allowable number of displayable sets (i.e., 30) by the number determined in S96, i.e., 1. Therefore, the quotient being 30 is obtained. Accordingly, the number of displayable data sets for the URL detected in S96, i.e., the URL with the identification number 100 being 0 (i.e., i=0), is set to be 30 during the time range between 6:00-11:59. Further, a number of data sets to be displayed being 0 (zero) is assigned to the URLs with the identification numbers 100 being 1 and 2 respectively, i.e., i=1, i=2. When the number of displayable data sets is zero, absence of the data set to be scroll-displayed is indicated by a sign "−" in FIG. 12B, and similarly in FIG. 12D. The example shown in FIG. 12D will be described later in detail.

During the time range between 12:00-14:59, as shown in FIG. 12B, for example, the data sets to be displayed are those included in the feed information obtained through the URLs with the identification numbers 100 being 0, 1, and 2 (i.e., i=0, i=1, i=3). Therefore, in S96, the CPU 14 determines the number of URLs having the data sets to be displayed is 3. Accordingly, in S97, the maximum allowable number of displayable data sets, i.e., 30, is divided by the number of URLs determined in S96, i.e., 3. The quotient 10 is obtained. Accordingly, the number of displayable data sets being 10 is assigned to each of the URLs with the identification numbers 100 being 0 (i=0), 1 (i=1), 2 (i=2).

As has been described above, when the new sets display option is "fixed," the number of displayable data sets for each URL is obtained by division. Therefore, even when the obtained feed information includes the number of pieces of updated-content information 132, i.e., the newly obtained data sets, being larger than the number of displayable data sets for each URL, the data sets are scroll-displayed in the display panel 50 within the number for the URL determined in S97.

According to the present embodiment, when the number of URLs determined in S96 is, for example, 4, and the maximum allowable number of data sets to be displayed 30 is divided by 4, the quotient 7.5 is obtained. However, the numbers of displayable data sets for the four URLs are set to be 8, 8, 7, and 7 respectively.

Description of FIG. 11 is continued. In S98, when the new sets display option is "variable" (S98: YES), in S99, the CPU 14 judges as to whether at least one of the new arrival indication flags 18f is on. When none of the new arrival indication flags 18f is on (S99: NO), it is determined that there is no newly obtained updated-content information 132. Therefore, modifying the number of displayable data sets is not necessary. The CPU 14 sets the numbers of data sets to be displayed determined in S97 to be the numbers of data sets to be scroll-displayed on the basis of URL. The displayable data set number determining process ends thereafter.

In S99, when at least one of the new arrival indication flags 18f is on (S99: YES), in S100, the CPU 14 examines the number of new arrival indication flags 18f being on basis of the URL and judges as to whether the number of new arrival indication flags 18f included in the updated-content information 132 obtained through the URL is greater than the number of data sets to be displayed assigned to the URL. In other words, it is judged as to whether there is a URL with the number of new arrival indication flags 18 being greater than the number of data sets to be displayed assigned to the URL.

In S100, when there is no URL with the number of new arrival indication flags 18f being greater than the number of data sets to be displayed assigned to the URL (S100: NO), it is determined that the entire data sets included in the newly obtained updated-content information 132 can be displayed in a scrolling line within the number of displayable data sets determined in S97. The CPU 14 sets the number of displayable data sets determined in S97 to be the number of data sets to be scroll-displayed on the basis of URL. The displayable data set number determining process ends thereafter.

In S100, when there is a URL with the number of new arrival indication flags 18f being greater than the number of data sets to be displayed assigned to the URL (S100: YES), in S101, the CPU 14 examines a total number of the new arrival indication flags 18f being on and judges as to whether the total number is smaller than or equal to the maximum allowable number of data sets to be displayed, which is stored in the display settings storage area 20c. When the total number of the new arrival indication flags 18f is greater than the maximum allowable number of data sets to be displayed (S101: NO), it is determined that the entire data sets included in the newly obtained updated-content information 132 cannot be displayed within the maximum allowable number of data sets to be displayed, even when the number of displayable data sets determined in S97 is modified. Therefore, the CPU 14 sets the number of displayable data sets determined in S97 to be the number of data sets to be scroll-displayed on the basis of URL. The displayable data set number determining process ends thereafter.

In S101, when the total number of the new arrival indication flags 18f is smaller than or equal to the maximum allowable number of data sets to be displayed (S101: YES), it is determined that the CPU 14 will adjust the number of displayable sets determined in S97 and set the adjusted number to be the number of data sets to be scroll-displayed on the basis of URL. The flow proceeds to S102.

In S102, the CPU 14 detects a URL with the number of new arrival indication flags 18f being greater than the latest number of data sets to be displayed assigned to the URL. The latest number of data sets to be displayed assigned to the URL is the number of data sets determined in S97 when S102 is performed for the first time, and the number at latest when S102 is repeated. In S103, the CPU 14 subtracts the number of new arrival indication flags 18f being on from the number of data sets to be displayed assigned to the detected URL. Thus, a shortage of data sets for displaying all the data sets included in the newly obtained updated-content information 132 is calculated and obtained.

In S104, the CPU 14 adds the shortage to the latest number of data sets to be displayed and increment the number of data sets to be displayed for the detected URL. In S105, the CPU 14 detects a URL with the number of new arrival indication flags 18f being smaller than the latest number of data sets to be displayed assigned to the URL. Further, the CPU 14 subtracts the number of new arrival indication flags 18f being on from the latest number of data sets to be displayed assigned to the URL. The latest number of data sets to be displayed assigned to the URL is the number of data sets determined in S97 when S105 is performed for the first time, and the number at latest when S105 is repeated. Thus, an extra number of data sets which is beyond the number of all the data sets included in the newly obtained updated-content information 132 is calculated and obtained. In S106, the CPU 14 compensates the extra obtained in S105 with the shortage obtained in S103 so that the data sets, which are not allowed to be displayed within the limit of the number of data sets to be displayed assigned to the URL, can be displayed within the limit of the extra number of sets. In other words, the CPU 14 decrements the number of data sets to be displayed assigned to the URL by the shortage obtained in S103 until the extra obtained in S105 is compensated. In this regard, therefore, when the shortage is greater than the extra obtained in S105, the number of data sets to be displayed assigned to the URL is not decremented to be smaller than the number of new arrival indication flags 18f being on for the URL.

In S107, the CPU 14 judges as to whether there is another URL with the number of new arrival indication flags 18 being greater than the number of data sets to be displayed assigned to the URL. When the CPU 14 detects another URL with the number of new arrival indication flags 18f being greater than the number of data sets to be displayed assigned to the URL (S107: YES), the flow returns to S103. Thereafter, the CPU 14 repeats S102-S107 until no URL with the number of new arrival indication flags 18f being greater than the number of data sets to be displayed assigned to the URL is detected. When no URL with the number of new arrival indication flags 18f being greater than the number of data sets to be displayed assigned to the URL is detected (S107: NO), the adjusted number of data sets to be displayed for the URL is set to be the number of data sets to be displayed for the data sets included in the updated-content information 132 obtained through the URL. The CPU 14 ends the displayable set number determining process.

The behaviors of the CPU 14 in S102-S107 will be described in detail with reference to FIGS. 12C and 12D. FIG. 12C illustrates the numbers of pieces of newly obtained updated-content information 132 (i.e., the new arrival indication flag 18f being on) in each time range. In the example shown in FIG. 12C, the data updating interval is set to be three hours (3 h), and the feed information is updated at 6:00. FIG. 12D illustrates the number of data sets to be displayed for each URL when the maximum allowable number of data sets to be displayed is set to be 30 and the new sets display option is "variable."

In the present example, the feed information is obtained at every three hour through the URLs set in the URL storage area 20b. Accordingly, the updated-content information 132 is updated, if newly obtained, at every three hour as well. Therefore, the number of pieces of newly obtained updated-content information 132 (i.e., the number of new arrival indication flags 18f being on) for each URL is updated when the feed information is obtained through the URL.

When the current time is 12:00, a number of pieces of newly obtained updated-content information 132 obtained through the URL with the identification number 100 being 1 (i=1) is 15, which is beyond the number (i.e., 10) of data sets to be displayed assigned to the URL for the time range 12:00-14:59 (see FIG. 12B). In this example, the total number of pieces of newly obtained updated-content information 132 is 30.

When the current time is 15:00, a number of pieces of newly obtained updated-content information 132 obtained through the URL with the identification number 100 being 2 (i.e., i=2) is 17, which is beyond the number (i.e., 15) of data sets to be displayed assigned to the URL for the time range 15:00-17:59 (see FIG. 12B). In this example, the total number of pieces of newly obtained updated-content information 132 is 30.

Therefore, in the displayable set number determining process shown in FIG. 11, when the current time obtained in S92 is 12:00 and 15:00, the CPU 14 makes affirmative judgment in S100 and in S101.

When the current time obtained in S92 is 12:00, in S102, the CPU 14 detects the URL with the identification number 100 being 1 (i.e., i=1) has the number of new arrival indication flags 18f being greater than the latest number of data sets to be displayed assigned to the URL in S97. In S103, the number of data sets to be displayed for the URL having the identification number 100 being 1 is short for 5 (i.e., 15−10=5). Thus, the shortage 5 is obtained. In S104, the shortage 5 is added to the number of data sets to be displayed assigned to the URL, i.e., 10. Thus, the number of data sets to be displayed assigned to the URL with the identification number being 1 is incremented to 15.

In S105, the CPU 14 examines the URLs to detect a URL with the number of new arrival indication flags 18f being smaller than the latest number (i.e., 10) of data sets to be displayed assigned to the URL in S97. In the present example, the URLs with the identification numbers 100 being 0 (i.e., i=0) and 2 (i.e., i=2) are detected. Further, in S105, the CPU 14 subtracts the number of new arrival indication flags 18f being on from the latest number of data sets to be displayed on the basis of URL. In particular, for the URL with the identification number 100 being 0, 8 is subtracted from 10, and for the URL with the identification number 100 being 2, 7 is subtracted from 10. Thus, the extras 2 and 3 are obtained for the URLs with the identification numbers 100 being 0 and 2 respectively.

In S106, the CPU 14 subtracts the extra 2 for the URL having the identification number 100 being 0 from the latest number (i.e., 10) of data sets assigned in S97 for the URL having the identification number 100 being 0 within the limit of the shortage (i.e., 5) obtained in S103. Thus, the number of data sets to be displayed assigned to the URL having the identification number 100 being 0 is decremented to 8. Instead, the number of data sets to be displayed assigned to the URL having the identification number 100 being 1 is incremented to 12, which is still short for 3 to display the entire newly obtained updated-content information 132. Therefore, the CPU 14 further subtracts the extra 3 for the URL having the identification number 100 being 2 from the latest number (i.e., 10) of data sets assigned in S97 for the URL having the identification number 100 being 0 within the limit of the shortage (i.e., 3). Thus, the number of data sets to be displayed assigned to the URL having the identification number 100 being 2 is decremented to 7. Instead, the number of data sets to be displayed assigned to the URL having the identification number 100 being 1 is incremented to 15. Thus, the CPU 14 compensates the extra (i.e., 2 and 3) obtained in S105 with the shortage (i.e., 5) obtained in S103.

According to the above adjustment, the numbers of data sets to be displayed assigned to the URLs having the identification numbers 100 being 0 (i=0), 1 (i=1), and 2 (i=2) are adjusted to 8, 15, and 7 respectively (see FIG. 12D). These adjusted numbers of data sets to be displayed are maintained within the time range 12:00-14:59 until the current time reaches the next updating interval, i.e., 15:00. Accordingly, the entire data sets included in the updated-content information 132 newly obtained at 12:00 can be displayed.

Thereafter, the CPU 14 judges that there is no URL remaining with the number of new arrival indication flags 18f being greater than the number of data sets to be displayed assigned to the URL. The CPU 14 ends displayable set number determining process.

A second example (not shown) of the behaviors of the CPU 14 in S102-S107 will be described. In the present example, the current time is obtained in S92 during the time range 12:00-14:59, and the feed information is updated at 12:00. The numbers of pieces of newly obtained updated-content information 132 through the URLs having the identification numbers 100 being 0 (i=0), 1 (i=1), and 2 (i=2) are 5, 11, and 12, respectively. In the present example, the flow S102-S106 is repeated and performed twice in total.

In the present example, in S102, the CPU 14 detects the URL with the identification number 100 being 1 (i.e., i=1) has the number of new arrival indication flags 18f being greater than the latest number of data sets to be displayed assigned to the URL in S97. In S103, the number of data sets to be displayed for the URL having the identification number 100 being 1 is short for 1 (i.e., 11−10=1). Thus, the shortage 1 is obtained. In S104, the shortage 1 is added to the number of data sets to be displayed assigned to the URL, i.e., 10. Thus, the number of data sets to be displayed assigned to the URL with the identification number being 1 is incremented to 11.

In S105, the CPU 14 examines the URLs to detect a URL with the number of new arrival indication flags 18f being smaller than the latest number (i.e., 10) of data sets to be displayed assigned to the URL in S97. In the present example, the URL with the identification numbers 100 being 0 (i.e., i=0) is detected. Further, in S105, the CPU 14 subtracts the number of new arrival indication flags 18f being on (i.e., 5) from the latest number (i.e., 10) of data sets to be displayed on the basis of URL. In particular, for the URL with the identification number 100 being 0, 5 is subtracted from 10. Thus, the extras 5 is obtained for the URL with the identification numbers 100 being 0.

In S106, the CPU 14 subtracts the extra 5 for the URL having the identification number 100 being 0 from the latest number (i.e., 10) of data sets assigned in S97 for the URL having the identification number 100 being 0 within the limit of the shortage (i.e., 1) obtained in S103. Thus, the number of data sets to be displayed assigned to the URL having the identification number 100 being 0 is decremented to 9. Instead, the number of data sets to be displayed assigned to the URL having the identification number 100 being 1 is incremented to 11.

In S107, the CPU 14 judges as to whether there is a URL remaining with the number of new arrival indication flags 18f being greater than the number of data sets to be displayed assigned to the URL. In the present example, the CPU 14 detects the URL having the identification number 100 being 2 (i=2) with the number (i.e., 12) of new arrival indication flags 18 being greater than the number (i.e., 10) of data sets to be displayed assigned to the URL.

The flow returns to S102, and the CPU 14 detects the URL with the identification number 100 being 2 (i.e., i=2) has the number of new arrival indication flags 18f being greater than the latest number of data sets to be displayed assigned to the URL in S97. In S103, the number of data sets to be displayed for the URL having the identification number 100 being 2 is short for 2 (i.e., 12−10=2). Thus, the shortage 2 is obtained. In S104, the shortage 2 is added to the number of data sets to be displayed assigned to the URL, i.e., 10. Thus, the number of data sets to be displayed assigned to the URL with the identification number being 2 is incremented to 12.

In S105, the CPU 14 examines the URLs to detect a URL with the number of new arrival indication flags 18f being smaller than the latest number (i.e., 9) of data sets to be displayed assigned to the URL in S97. In the present example, the URL with the identification numbers 100 being 0 (i.e., i=0) is detected. Further, in S105, the CPU 14 subtracts the number of new arrival indication flags 18f being on (i.e., 5) from the latest number (i.e., 9) of data sets to be displayed on the basis of URL. In particular, for the URL with the identification number 100 being 0, 5 is subtracted from 9. Thus, the extras 4 is obtained for the URL with the identification numbers 100 being 0.

In S106, the CPU 14 subtracts the extra 4 for the URL having the identification number 100 being 0 from the latest number (i.e., 9) of data sets assigned in S97 for the URL having the identification number 100 being 0 within the limit of the shortage (i.e., 2) obtained in S103. Thus, the number of data sets to be displayed assigned to the URL having the identification number 100 being 0 is decremented to 7. Instead, the number of data sets to be displayed assigned to the URL having the identification number 100 being 1 is incremented to 12.

According to the above adjustment, the numbers of data sets to be displayed assigned to the URLs having the identification numbers 100 being 0 (i=0), 1 (i=1), and 2 (i=2) are adjusted to 7, 11, and 12 respectively. These adjusted numbers of data sets to be displayed are maintained within the time range 12:00-14:59 until the current time reaches the next updating interval, i.e., 15:00. Accordingly, the entire data sets included in the updated-content information 132 newly obtained at 12:00 are allowed to be displayed.

Thereafter, the CPU 14 judges that there is no URL remaining with the number of new arrival indication flags 18f being greater than the number of data sets to be displayed assigned to the URL. The CPU 14 ends displayable set number determining process.

Next, the behaviors of the CPU 14 in S102-S107 in the time range 15:00-17:59 will be described with reference to FIG. 12C. During the time range 15:00-17:59, in S102, the CPU 14 detects the URL with the identification number 100 being 2 (i.e., i=2) has the number of new arrival indication flags 18f being greater than the latest number (i.e., 15) of data sets to be displayed assigned to the URL in S97. In S103, the number of data sets to be displayed for the URL having the identification number 100 being 2 is short for 2 (i.e., 17-15=2). Thus, the shortage 2 is obtained. In S104, the shortage 2 is added to the number of data sets to be displayed assigned to the URL, i.e., 15. Thus, the number of data sets to be displayed assigned to the URL with the identification number being 2 is incremented to 17.

In S105, the CPU 14 examines the URLs to detect a URL with the number of new arrival indication flags 18f being smaller than the latest number (i.e., 15) of data sets to be displayed assigned to the URL in S97. In the present example, the URL with the identification numbers 100 being 1 (i.e., i=1) is detected. Further, in S105, the CPU 14 subtracts the number of new arrival indication flags 18f being on (i.e., 2) from the latest number (i.e., 15) of data sets to be displayed on the basis of URL. In particular, for the URL with the identification number 100 being 1, 2 is subtracted from 15. Thus, the extra 13 is obtained for the URL with the identification numbers 100 being 1.

In S106, the CPU 14 subtracts the extra 13 for the URL having the identification number 100 being 1 from the latest number (i.e., 15) of data sets assigned in S97 for the URL having the identification number 100 being 0 within the limit of the shortage (i.e., 2) obtained in S103. Thus, the number of data sets to be displayed assigned to the URL having the identification number 100 being 1 is decremented to 13. Instead, the number of data sets to be displayed assigned to the URL having the identification number 100 being 2 is incremented to 17.

According to the above adjustment, the numbers of data sets to be displayed assigned to the URLs having the identification numbers 100 being 0 (i=0), 1 (i=1), and 2 (i=2) are adjusted to 0, 13, and 17 respectively (see FIG. 12D). These modified numbers of data sets to be displayed are maintained within the time range 15:00-17:59 until the current time reaches the next updating interval, i.e., 18:00. Accordingly, the entire data sets included in the updated-content information 132 newly obtained at 15:00 are allowed to be displayed.

In the example shown in FIG. 12C, a piece of updated-content information 132 is newly obtained through the URL with the identification number 100 being 0 (i=0). However, the data sets included in the newly obtained updated-content information 132 obtained through the URL with the identification number 100 being 0 (i=0) is set not to be displayed. Therefore, the piece of newly obtained updated-content information 132 does not affect the adjustment of the numbers of data sets to be displayed among the URLs. Similarly, 17 pieces of updated-content information 132 are newly obtained through the URL with the identification number 100 being 1 (i=1) at 9:00. However, the data sets included in the newly obtained updated-content information 132 obtained through the URL with the identification number 100 being 1 (i=1) is set not to be displayed during the time range 6:00-11:59. Further, 20 pieces of updated-content information 132 are newly obtained through the URL with the identification number 100 being 0 (i=0) at 18:00. However, the data sets included in the newly obtained updated-content information 132 obtained through the URL with the identification number 100 being 0 (i=0) is set not to be displayed during the time range 18:00-20:59. Therefore, these numbers of pieces of newly obtained updated-content information 132 do not affect the adjustment of the numbers of data sets to be displayed.

As has been described above, with the new sets display option "variable," when the number of new arrival indication flags 18f being on basis of the URL is greater than the number of data sets to be displayed assigned to the URL in S97, and when the total number of the new arrival indication flags 18f being on is smaller than or equal to the maximum allowable number of data sets to be displayed, the number of data sets to be displayed can be adjusted among the URL basis so that the adjusted number of data sets included in the newly obtained updated-content information 132 can be adjustably scroll-displayed. According to the above configuration, therefore, when the user sets the URLs (i.e., displayable information 112), the display starting times, and the display completion times to display the information obtained through the URLs on the display panel 50, the data sets included in the obtained information can be efficiently displayed in the time ranges set by the user. Specifically, the newly obtained information can be presented to the user timely and effectively in shorter times.

According to the above configuration, when the number of new arrival indication flags 18f being on is smaller than the number of data sets to be displayed assigned to the URL, the number of data sets to be displayed can be decremented so that the subtracted number of data sets can be passed to another URL having the number of new arrival indication flags 18 being greater than the assigned number of data sets to be displayed. When the shortage is subtracted from the number of data sets to be displayed being greater than the number of new arrival indication flags 18f, the subtracted amount is limited to be within the extra obtained in S105. Therefore, the number of data sets to be displayed assigned to the URL is prevented from being decremented to be too small to display the entire data sets included in the newly obtained updated-content information 132.

Figure 10:
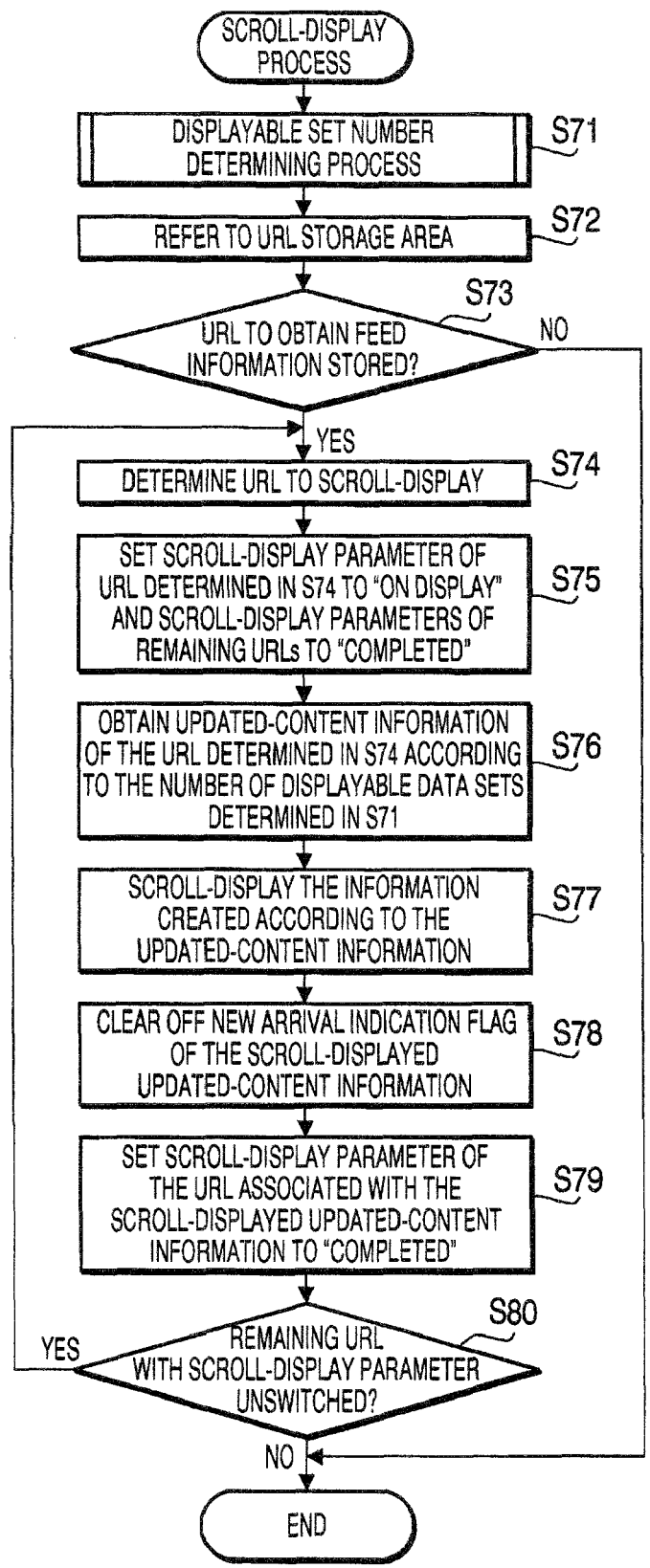
FIG. 10 is a flowchart to illustrate a scroll-display process to be performed in the MFP according to the embodiment of the present invention.

Description of scroll-display process in FIG. 10 is continued, following the displayable set number determining process in S71, in S72, the CPU 14 refers to the URL storage area 20b. In S73, the CPU 14 examines as to whether a URL being the source of the feed information is stored. If no URL is stored (S73: NO), it is determined that no feed information has been obtained, and no data set can be presented in a scrolling line in the display panel. The CPU 14 terminates the scroll-display process.

In S73, if a URL being the source of the feed information is stored (S73: YES), in S74, the CPU 14 determines the URL, of which data sets are to be scroll-displayed in the display panel 50. In particular, the CPU 14 determines a value for the sign i representing the identification information 110 stored in the displayable information storage area 18c (see FIG. 4). In the present embodiment, the CPU 14 determines the URL having a smallest number for the identification information 110, i.e., i=0 for the first determination, to be the URL for the data sets are to be scroll-displayed.

In S75, the CPU 14 sets a scroll-display parameter for the URL determined in S74 to be "on display," and the scroll-display parameters for the remaining URLs to be "completed." According to the present embodiment, the scroll-display parameter is assigned to each URL stored in the URL storage area 20b. When the scroll-display parameter "on display" is set to a URL, the data sets including the content title 140 and the content updated date 142 generated based on the feed information obtained through the URL are currently being displayed in a scrolling line in the display panel 50. When the scroll-display parameter "completed" is set to a URL, the data sets are not currently displayed. According to the settings of the scroll-display parameters, the CPU 14 can recognize the URL to which the data sets being currently displayed belong. The scroll-display parameters are stored in a predetermined area (not shown) in the RAM 18.

Following S75, in S76, the CPU 14 obtains the updated-content information 132 associated with the URL determined in S74 from the displayable information storage area 18c. In particular, the CPU 14 obtains the updated-content information 132 according to the number of data sets determined in the displayable set number determining process in S71 in the ascending order of the identification number 130 from 0 (i.e., j=0) to m−1 (j=m−1). The updated-content information 132 is stored in the displayable information storage area 18c in the ascending order of the identification information 130 on the basis of URL; therefore, the updated-content information 132 obtained in S75 includes all the newly obtained updated-content information 132.

Following S76, in S77, the CPU 14 scroll-displays the data sets including the content title 140 and the content updated data 142 included in the obtained updated-content information 132 in the display panel 50.

In S78, the CPU 14 clears off the new arrival indication flags 18f of the updated-content information 132 having been displayed in S77. In S79, the CPU 14 sets the scroll-display parameter for the URL associated with the updated-content information 132 to "completed." In S80, the CPU 14 examines the URLs stored in the URL storage area 20b to judge as to whether there is any remaining URL of which scroll-display parameter has never been switched to "on display" and as to whether there is any remaining URL of which associated updated-content information 132 has not been displayed.

In S80, in particular, the CPU 14 detects the presence of remaining URL based on the identification information 110 (i) determined in S74. When the identification information 110 determined in S74 has not reached the maximum value n−1, it is judged that there is a remaining URL, of which scroll-display parameter has never been switched to "on display." When the identification information 110 determined in S74 reaches the maximum value n−1 (i.e., i=n−1), it is judged that the scroll-display parameters of all the URLs were once switched to "on display."

In S80, when it is judged that there is a remaining URL of which scroll-display parameter has never been switched to "on display" (S80: YES), the flow returns to S74, and the CPU 14 determines the URL, of which data sets are to be scroll-displayed in the display panel 50. In this regard, the CPU 14 increments the value for the sign i representing the identification information 110 by 1 and determines the URL with the incremented identification information 110.

In S80, when it is judged that there is no remaining URL, i.e., the scroll-display parameters of all the URLs were once switched to "on display" (S80: NO), the CPU 14 ends the scroll-display process.

According to the process described above, a number of data sets including the content title 140 and the content update date information 142 can be displayed in the scrolling line in the display panel whilst the number of data sets are determined in the displayable set number determining process in S71.

According to the MFP 10 in the present embodiment, the time ranges, in which the data sets including the content title 140 and the content updated date 142 are scroll-displayed can be set on the basis of the URL, which is the source of the data sets. Thus, the data sets including the content title 140 and the content updated date 142 can be displayed in the scrolling line in the display panel 50 during the time range preset on the basis of the URL. Thus, the data sets provided by the content providing servers 90, 91 can be selectively displayed according to the time ranges set on the basis of URL, and a waiting period for the user to wait for information, including the content title 140 and the content updated date 142, to be displayed can be shortened. Thus, the user can obtain desired information timely in shorter time.

Although an example of carrying out the invention has been described, those skilled in the art will appreciate that there are numerous variations and permutations of the communication device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in S101 of the displayable set number determining process in the above embodiment, the number of displayable data sets determined in S97 is determined to be the number of data sets to be scroll-displayed on the basis of URL when the total number of the new arrival indication flags 18f is greater than the maximum allowable number of data sets to be displayed. However, when the numbers of data sets included in the newly obtained updated-content information 132, which is obtained at 12:00, for the URLs with the identification numbers 100 being 0 (i=0), 1 (i=1), and 2 (i=2) are 15, 10, and 6, respectively, and the total number of the data sets exceeds the maximum allowable number (i.e., 30) of data sets to be displayed, the numbers of data sets to be displayed for the respective URLs can be adjusted to be "15, 10, 5" respectively in place of the numbers (i.e., 10, 10, 10) of data sets to be displayed assigned to each URL in S97. With this adjustment, although one of the data sets of the updated-content information 132 obtained through the URL with the identification number 100 being 2 (i.e., i=2) is not included to be displayed, five extra data sets of the updated-content information 132 obtained through the URL with the identification number 100 being 0 (i.e., i=0) are benefitted to be displayed.

In the above embodiment, the information including the content title 140 and the content updated date 142 are scroll-displayed in the display panel 50 of the MFP 10. However, the information may be displayed in a display panel equipped to various other devices, such as a scanner device, a printer device, and a telephone set.

In the above embodiment, further, the MFP 10 is connected in wires with the PC 70 and the PC 71 within the MFP system 2. However, the MFP 10, the PCs 70, 71 may be equipped with wireless interfaces, and the MFP 10 can communicate with the PCs 70, 71 wirelessly.

In the above embodiment, each of the content providing servers 90, 91 stores the information contents and the feed information. However, the information contents and the feed information may be separately stored in different servers.

In the above embodiment, the MFP 10 is not operated on a browser program, however, the MFP 10 may have a browser program installed therein. When the browser program is installed in the MFP 10, the MFP 10 may download the information contents from the content providing servers 90, 91 to display the information contents in the display panel 50.

What is claimed is:

1. A communication device capable of accessing a network device storing content summary information according to summary location information, indicating a source of the content summary information, the content summary information including information concerning contents provided by an information providing server, comprising:
   a clock configured to indicate current time;
   a location information storage configured to store a plurality of pieces of the summary location information;
   a summary information obtaining system configured to access the network device according to the summary location information stored in the location information storage and obtain the content summary information;
   a summary information storage configured to store the obtained content summary information;
   a display system configured to display the information concerning the contents generated based on the content summary information;
   a time range setting system configured to set a predetermined time range to display the information concerning the contents in the display system for each of the pieces of the summary location information by defining a starting time, at which the information concerning the contents starts being displayed, and a completion time, at which display of the information concerning the contents is completed;
   an extractor configured to extract the content summary information which is set to be displayed in the display system during the predetermined time range from the summary information storage when the current time indicated by the clock is included in the predetermined time range; and
   a display controller configured to control the display system to display the information concerning the contents which is included in the extracted summary information during the predetermined time period set by the time range setting system.

2. The communication device according to claim 1, wherein the display controller controls a number of pieces of information concerning the contents to be displayed for each piece of the summary location information; and
   wherein the number of pieces of information concerning the contents to be displayed to be assigned to each piece of the summary location information is determined based on a predetermined maximum allowable number.

3. The communication device according to claim 2, wherein the display controller is provided with an adjustable display system, which, when a plurality of pieces of content summary information are extracted by the extractor, modifies the number of pieces of information concerning the contents to be displayed for each piece of the summary location information and displays the adjusted number of pieces of information concerning the contents which is included in newly obtained content summary information.

4. The communication device according to claim 3, further comprising:
   a previous summary information storage configured to store the content summary information having been obtained previously by the summary information obtaining system and stored in the summary information storage; and
   a detector configured to compare the previously obtained content summary information stored in the previous summary information storage with the content summary information extracted by the extractor, detect new information concerning the contents which is included in the newly obtained content summary information extracted by the extractor, and count a number of pieces of detected new information concerning the contents.

5. The communication device according to claim 4,
wherein a total number of pieces of information concerning the contents to be displayed in the display system is limited to be within the predetermined maximum allowable number;
wherein the adjustable display system is provided with:
a displayable number setting system configured to assign a displayable number of pieces of information concerning the contents included in the extracted content summary information for each piece of the summary location information of the extracted content summary information;
a first judging system configured to judge presence or absence of the content summary information including a larger number of pieces of new information concerning the contents than the assigned displayable number based on the detected number counted by the detector;
a second judging system configured to judge presence or absence of the content summary information including a smaller number of pieces of new information concerning the contents than the assigned displayable number based on the detected number counted by the detector;
an incrementing system configured to increment the displayable number of pieces of information concerning the contents when the first judging system determines the presence of the content summary information including a larger number of pieces of new information concerning the contents than the assigned displayable number; and
a decrementing system configured to decrement the displayable number of pieces of information concerning the contents when the second judging system determines the presence of the content summary information including a smaller number of pieces of new information concerning the contents than the assigned displayable number.

6. The communication device according to claim 5,
wherein the adjustable display system is provided with a third judging system configured to judge as to whether a total number of pieces of new information concerning the contents counted by the detector is within the predetermined maximum allowable number; and
wherein the incrementing system includes a first incrementing system, which increments the displayable number for the content summary information, of which presence is determined by the first judging system, by adding an extra amount being a number of pieces of new information exceeding the assigned displayable number to the assigned displayable number, when the third judging system judges that the total number of pieces of new information concerning the contents counted by the detector is within the predetermined maximum allowable number; and
wherein the decrementing system includes a first decrementing system, which decrements the displayable number for the content summary information, of which presence is determined by the second judging system, by subtracting an amount equivalent to the extra amount exceeding the assigned displayable number from the assigned displayable number.

7. The communication device according to claim 6,
wherein the amount subtracted from the assigned displayable number by the first decrementing system is restricted to be within a limit, which is a difference between the assigned displayable number and the smaller number of pieces of new information concerning the contents included in the content summary information, of which presence is determined by the second judging system.

8. The communication device according to claim 4,
wherein the number of pieces of information concerning the contents to be displayed is determined based on the predetermined maximum allowable number and the number of pieces of the detected new information concerning the contents.

9. The communication device according to claim 8,
wherein the summary information obtaining system obtains the determined number of pieces of information concerning the contents, the number being determined based on the predetermined maximum allowable number and the number of pieces of the detected new information concerning the contents, from the network device; and
wherein the display controller controls the display system to display the obtained information concerning the contents.

* * * * *